US005416725A

United States Patent [19]

Pacheco et al.

[11] Patent Number: 5,416,725

[45] Date of Patent: May 16, 1995

[54] COMPUTER-BASED NOTIFICATION SYSTEM HAVING REDUNDANT SENSOR ALARM DETERMINATION AND ASSOCIATED COMPUTER-IMPLEMENTED METHOD FOR ISSUING NOTIFICATION OF EVENTS

[75] Inventors: Steven M. Pacheco, Carrollton; Dennis B. Harris, Allen, both of Tex.

[73] Assignees: P.C. Sentry, Inc., Richardson; Harris Partners, Ltd., Allen, both of Tex.

[21] Appl. No.: 137,504

[22] Filed: Oct. 15, 1993

Related U.S. Application Data

[62] Division of Ser. No. 108,884, Aug. 18, 1993.

[51] Int. Cl.[6] .................... G08B 29/16; G08B 21/00; G05B 15/02

[52] U.S. Cl. .................... 364/514; 364/550; 340/508; 340/522; 340/825.06; 340/825.08; 340/540

[58] Field of Search .................... 340/825.06, 825.07, 340/825.08, 825.3, 508, 540, 541, 545, 577, 578, 522, 554; 379/43, 49; 364/550, 514

[56] References Cited

U.S. PATENT DOCUMENTS 4,195,286 3/1980 Galvin .................... 340/501
4,331,952 5/1982 Galvin et al. .................... 340/508
5,134,644 7/1992 Gaston et al. .................... 379/39

*Primary Examiner*—Emanuel T. Voeltz
*Assistant Examiner*—Kamini S. Shah
*Attorney, Agent, or Firm*—Konneker & Bush

[57] ABSTRACT

A notification system for reporting events occurring within a defined area being monitored thereby. The notification system includes a plurality of sensors installed at selected locations within the defined area and a sensor interface coupled to each of the sensors. The sensor interface periodically polls the sensors and stores status information received therefrom. Coupled to the sensor interface is a computer system for receiving and analyzing the stored status data. Upon determining from the status data that an event requiring issuance of a notification has occurred, the computer system issues a series of notifications for which each recipient of a notification receives a selected message regarding the event.

16 Claims, 10 Drawing Sheets

COMPUTER-BASED NOTIFICATION SYSTEM HAVING REDUNDANT SENSOR ALARM DETERMINATION AND ASSOCIATED COMPUTER-IMPLEMENTED METHOD FOR ISSUING NOTIFICATION OF EVENTS

This is a division, of application Ser. No. 08/108,884, filed Aug. 18, 1993.

BACKGROUND OF THE INVENTION

1. Field of the Invention

The present invention generally relates to a computer-based notification system and, more particularly, to a computer-based notification system configured to provide automatic notification of events to selected recipients by asynchronously transmitting selected messages thereto.

2. Description of Related Art

Heretofore, commercially available notification systems have been restricted to alarm systems having very limited notification capabilities. Such systems typically include a number of sensors, most commonly, either of the switch or motion type, fixedly mounted at various locations within a structure and connected to a master panel. If one of the sensors change state, for example by opening a door having a switch installed between the door and its frame, the state change is detected at the master panel. Upon detection of the state change, the master panel reports an alarm condition to a remote monitoring station using a telephone line associated therewith. Personnel at the remote monitoring station are then asked to confirm the alarm condition, most commonly by a return telephone call to the house and/or to one or more designated persons, for example, neighbors or friends of the owner of the structure. If not reassured that a false alarm has been issued, personnel at the remote monitoring station will then dispatch an emergency vehicle to the structure.

As can be readily appreciated by those skilled in the art, there are numerous shortcomings in such a system. Typically, such systems only inform the remote monitoring station that one of the sensors installed at the structure has been triggered and provides no other information regarding the type or nature of the alarm condition. The ability of the remote monitoring station to properly respond to the notification of an alarm condition is, therefore, quite constrained. If, however, detailed information related to the alarm condition itself accompanied the notification of the remote monitoring station, the ability of the remote monitoring station to respond to the notification of an alarm condition would be greatly enhanced. For example, if the information accompanying the triggering of a sensor could be individually tailored for each sensor, the recipient of such information could react based upon the exact nature of the event taking place at the structure.

Another shortcoming to such systems is that the recipient of a notification of an alarm condition rarely has the information at hand needed to determine whether the alarm is actually indicative of an emergency situation. Certain sensors, for example, pressure sensors installed between an entry door and its frame are prone to false alarms, particularly during severe or rapidly changing weather conditions. The recipient of the notification of an alarm condition, however, is rarely able to distinguish between an alarm condition issued by a sensor prone to false alarms and those issued by sensors almost always triggered by a true alarm condition requiring an emergency response. It would be desirable, therefore, to provide a system capable of discerning the criticality of various alarm conditions and vary the notification process appropriately.

It can be readily seen from the foregoing that it would be desirable to provide an improved computer-based notification system for reporting the occurrence of events within a monitored structure which is capable of providing enhanced information regarding the nature of alarm conditions detected by each sensor included as part of the notification system. Accordingly, it is an object of the present invention to provide such an improved computer-based notification system.

SUMMARY OF THE INVENTION

In one embodiment, the present invention is of a computer-implemented method of issuing a notification of an occurrence of an event within a defined area. Each one of a plurality of sensors positioned within the defined area are configured as either a non-redundant type sensor or a redundant type sensor. When a transition into an alarm condition is detected for a first one of the plurality of sensors, a determination is made as to whether the sensor transitioning into the alarm condition is configured as a non-redundant type sensor or a redundant type sensor. Upon determining that the sensor is configured as a non-redundant type sensor, a first notification to a first group of selected recipients is issued. In one aspect thereof, a second notification is issued to a second group of selected recipients if it is determined that the sensor is configured as a redundant type sensor. In another aspect thereof, the first notification may include an emergency message and the first group of selected recipients include emergency personnel while the second notification contains a non-emergency message and the second group of selected recipients does not include emergency personnel.

In yet another aspect thereof, each of the sensors configured as a redundant type sensor are assigned to a sensor group having at least two of the sensors included therein. When a transition into an alarm condition is detected for a second one of the plurality of sensors, a determination is made as to whether the second sensor is configured as a non-redundant type sensor or a redundant type sensor. Upon determining that the second sensor is configured as a non-redundant type sensor, the first notification is issued to the first group of selected recipients. If, however, it is determined that the second sensor is configured as a redundant type sensor, a determination is then made as to whether all of the sensors grouped with the second sensor have also transitioned into the alarm condition. If all of the sensors grouped with the second sensor have transitioned into the alarm condition, the first notification is issued to the first group of selected recipients. If, however, all of the sensors grouped with the second sensor have not transitioned into the alarm condition, the second notification is issued to the second group of selected recipients. In still yet another aspect thereof, the time elapsed between the transition of the first sensor in the sensor group into the alarm condition and the transition of the remaining sensors in the sensor group into the alarm condition is measured. The first notification is then issued to the first group of selected recipients if all of the sensors in the sensor group transitioned into the alarm condition within a preselected time period.

In another embodiment, the present invention is of a computer-implemented method of issuing a notification of an occurrence of an event within a defined area. Each one of a plurality of sensors positioned within the defined area are configured as either a non-redundant type sensor or a redundant type sensor. Each of the sensors configured as a redundant type sensor are then assigned to a sensor group having at least two sensors included therein. Transitions of respective ones of the plurality of sensors into an alarm condition are then detected. If the sensors transitioning into the alarm condition include at least one sensor configured as a non-redundant type sensor, a first notification to a first group of selected recipients is issued. If the sensors transitioning into the alarm condition includes at least one sensor configured as a redundant type sensor, a determination is made for each of the redundant type sensors transitioning into the alarm condition as to whether all of the sensors grouped with the redundant type sensors transitioning into the alarm condition have also transitioned into the alarm condition. Upon determining that all of the sensors grouped with the redundant type sensors transitioning into the alarm condition have also transitioned into the alarm condition, the first notification is issued to the first group of selected recipients. If, however, it is determined that all of the sensors grouped with the redundant type sensors transitioning into the alarm condition have not transitioned into the alarm condition, a second notification is issued to a second group of selected recipients. In one aspect thereof, the first notification may include an emergency message and the first group of selected recipients include emergency personnel while the second notification contains a non-emergency message and the second group of selected recipients does not include emergency personnel. In another aspect thereof, the time elapsed between the transition of a first sensor in the sensor group into the alarm condition and the remaining sensors in the sensor group is measured and, if all of the sensors in the sensor group transition into the alarm condition within a preselected time period after the first sensor transitioned into the alarm condition, the first notification is issued to the first group of selected recipients.

In another embodiment, the present invention is of a notification system for reporting events occurring within a defined area being monitored by the notification system. The notification system includes a plurality of sensors installed at selected locations within the defined area and a computer system coupled to each of the plurality of sensors. The computer system includes means for detecting an alarm condition for each of the sensors and means for determining, from the detected alarm condition, if an event requiring issuance of a notification has occurred. If such an event has occurred, the computer system issues a notification regarding the event to a recipient using issue notification means incorporated therein. In one aspect thereof, the computer system further includes means for selectively configuring each of the sensors as either a non-redundant type sensor or a redundant type sensor. The computer system also includes means which determine, when an alarm condition is detected, whether the detected alarm condition originated at a non-redundant type sensor and whether an event requiring issuance of a notification has occurred. In another aspect thereof, the computer system further includes means for determining if the detected alarm condition originated at a redundant type sensor and whether an event requiring issuance of a notification has occurred. In yet another aspect thereof, the computer system includes means for issuing a limited notification if the detected alarm condition originated at a redundant type sensor and an alarm condition has not been detected for each one of the preselected group of sensors associated with the sensor for which the original alarm condition had been detected. In yet another aspect thereof, the computer system includes means for determining the time elapsed between detection of an alarm condition for a first sensor of the preselected group of sensors and detection of an alarm condition for the remaining sensors of the preselected group and means for determining whether an event requiring issuance of a notification has occurred if the first sensor at which the alarm condition originated is a redundant type sensor and if an alarm condition has been detected for each of the preselected group of sensors within a preselected time period after the first sensor transitioned into the alarm condition.

In another embodiment, the present invention is of a notification system for reporting events occurring within a defined area being monitored thereby. The notification system includes a plurality of sensors installed at selected locations within the defined area, a sensor interface coupled to each of the sensors and a computer system coupled to the sensor interface. The sensor interface including means for periodically polling each of the sensors and means for storing status information for each of the sensors. The computer system includes means for polling the sensor interface for the stored status information, means for determining, from the status information, whether an alarm condition has been detected for each of the plurality of sensors, means for determining, from the detected alarm conditions, if an event requiring issuance of a notification has occurred, and means for issuing a notification regarding the event to a recipient.

In various aspects thereof, the computer system further includes means for selectively configuring each of the plurality of sensors as either a non-redundant type sensor or a redundant type sensor, means for determining if the detected alarm condition originated at a redundant or non-redundant type sensor and means for determining, based upon the detected alarm conditions originating at redundant or non-redundant type sensors, whether an event requiring issuance of a notification has occurred, and means for issuing a limited notification if the detected alarm condition originated at a redundant type sensor and an alarm condition has not been detected for each one of the preselected group of sensors.

BRIEF DESCRIPTION OF THE DRAWING

The invention will be better understood, and its numerous objects, advantages and features will become apparent to those skilled in the art by reference to the following drawing in which.

DETAILED DESCRIPTION

Figure 1:
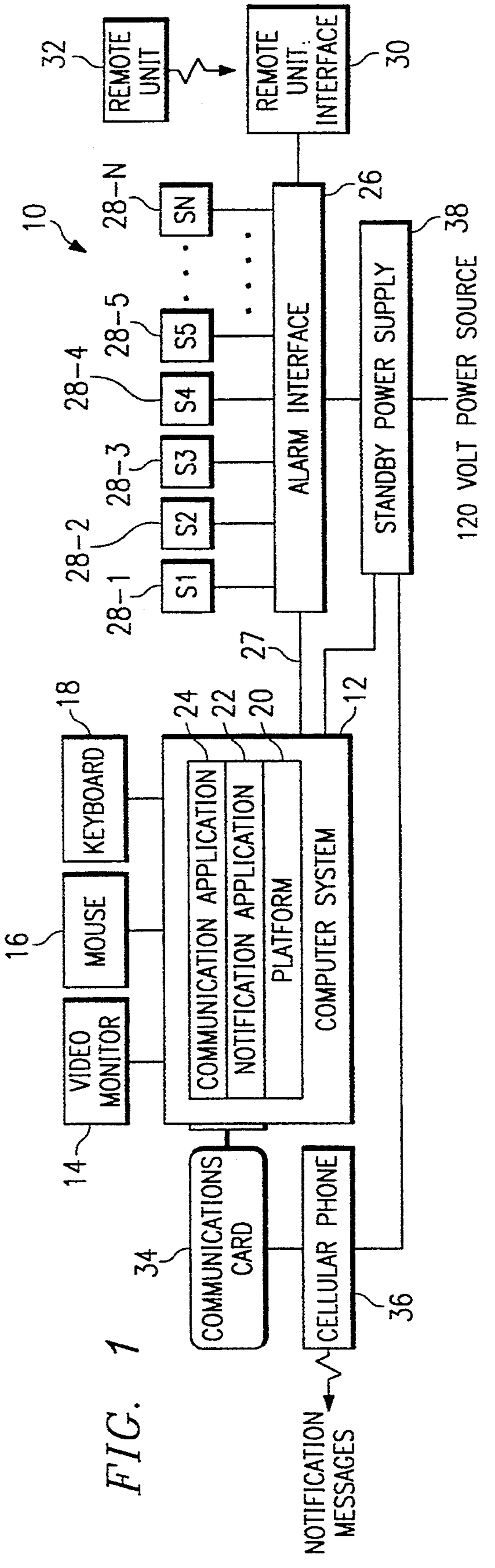
FIG. 1 is a block diagram of a computer-based notification system for reporting the occurrence of events which is constructed in accordance with the teachings of the present invention.

Referring first to FIG. 1, a computer-based notification system 10 constructed in accordance with the teachings of the present invention may now be seen. The notification system 10 includes a computer system 12 which acts as a central console for the notification system 10. For example, an IBM PC or other IBM-compatible personal computer having a 386 type microprocessor operable at 33 MHz, 80 MBytes of auxiliary memory and 2 MByte of RAM would be suitable for the uses contemplated herein. Coupled to the computer system 12 are a video monitor 14, mouse 16 and keyboard 18, all of conventional design.

Installed in the computer system 12 is shell software having a suitable platform 20, for example, an application process interface (or "API") for the operation of a notification application 22. For example, Microsoft Windows 3.1 would be a suitable platform 20 from which the notification application 22 may be launched. As will be more fully described below, the notification application 22 is responsible for receiving data from a plurality of sensors located within a structure being monitored, analyzing the received data to determining when to issue notifications, issuing notifications to selected recipients, and maintaining an internal database of phone, sensor and other information necessary for issuing a series of such notifications. As will also be more fully described below, during the initialization of the notification application 22, configuration information for the notification application 22 is loaded and a communication application 24 launched. The communication application 24 provides both an internal and an external interface for the notification application 22. Data collected by various sensors are transmitted to the notification application 22 via the communication application 24 and notifications determined by tile notification application 22 using the collected data are issued by the communication application 24.

Interconnected with a serial port of the computer system 12 is an alarm interface 26. The alarm interface 26 receives information from a plurality of sensors 28-1 through 28-N, processes the received information, and transmits the processed information to the computer system 26 via an RS485 interface. It is contemplated that any number of sensors 28-1 through 28-N may be interconnected to the alarm interface 26, although, in the example described herein, it is contemplated that the alarm interface 26 is interconnected with fifteen sensors 28-1 (S0001) through 28-15 (S0015). The alarm interface 26 is also interconnected with a remote control interface 30. The remote control interface 30 receives RF signals from a remote unit 32, converts the received RF signals into digital signals and transfers the converted signals to the alarm interface 26. In various configurations thereof, the remote unit 32 may be a remote controller capable of enabling or disabling the notification system 10 or a remotely positioned sensor similar in function to the sensors 28 except that information transfers to the alarm interface 26 take place via the remote unit interface 30.

The sensors 28-1 through 28-N and/or the remote unit 32 (if configured as a sensor) may be any one of various types, including switches for detecting changes between normally open and normally closed states, motion detectors for detecting movement within a specified distance of the sensor, keypads for providing authorization and/or entry codes which permit on-site enablement/disablement of the notification system 10 as well as any alarm conditions detected thereby, temperature sensors for detecting temperatures outside of a preselected range, or other commercially available types of sensors.

While the particular configuration of sensors S0001–S0015 which would be installed within a given structure would vary depending on the particular purposes for which the structure is used, an exemplary sensor configuration for the notification system 10 is as follows:

| Sensor | Location | Type |
|---|---|---|
| S0001 | Main Entrance | Keypad |
| S0002 | Rear Entrance | Keypad |
| S0003 | East Entrance | Keypad |
| S0004 | Main Door | Switch |
| S0005 | Rear Door | Switch |
| S0006 | Shipping Dock | Switch |
| S0007 | N. Windows | Switch |
| S0008 | E. Windows | Switch |
| S0009 | W. Windows | Switch |
| S0010 | Office Area 1 | Motion |
| S0011 | Office Area 2 | Motion |
| S0012 | Warehouse | Temperature |
| S0013 | Location 1 | Temperature |
| S0014 | Location 2 | Temperature |
| S0015 | Location 3 | Temperature |

Installed on an expansion bus (not shown) of the computer system 12 is a communications card 34. Upon a determination by the notification application 22 that a notification comprised of a selected message or messages should be transmitted to a selected recipient or recipients, the communication application 24 issues one or more phone notifications using the communications card 34 and a cellular phone 36 connected thereto. In this manner, the communication application 24 will initiate and complete the transmission, in sequence, of notification messages to a series of selected recipients. As will be more fully described below, each one of the notification messages may be selectively configured as either a page, voice, facsimile, or data type message and selectively directed to police, fire, or medical emergency personnel and/or selected persons having an interest in receiving notifications regarding the occurrence of events at the monitored structure. It is further contemplated that various persons notified of the same event may receive messages of differing type and/or content and that multiple messages, each of a different type, may be transmitted to a single person and/or destination.

A 120 volt power source, preferably an interconnection with the local power distribution system, is used to provide power to the computer system 12, the alarm interface 26, the sensors 28-1 through 28-N and the cellular phone 36. External power is supplied to the various components of the notification system 10 via a standby power supply 38 which includes a rechargeable battery (not shown). In the event of a power interruption, the standby power supply 38 will use the battery to provide power to the computer system 12, the alarm interface 26, the sensors 28-1 through 28-N and the cellular phone 36 for up to 60 minutes.

Figure 2:
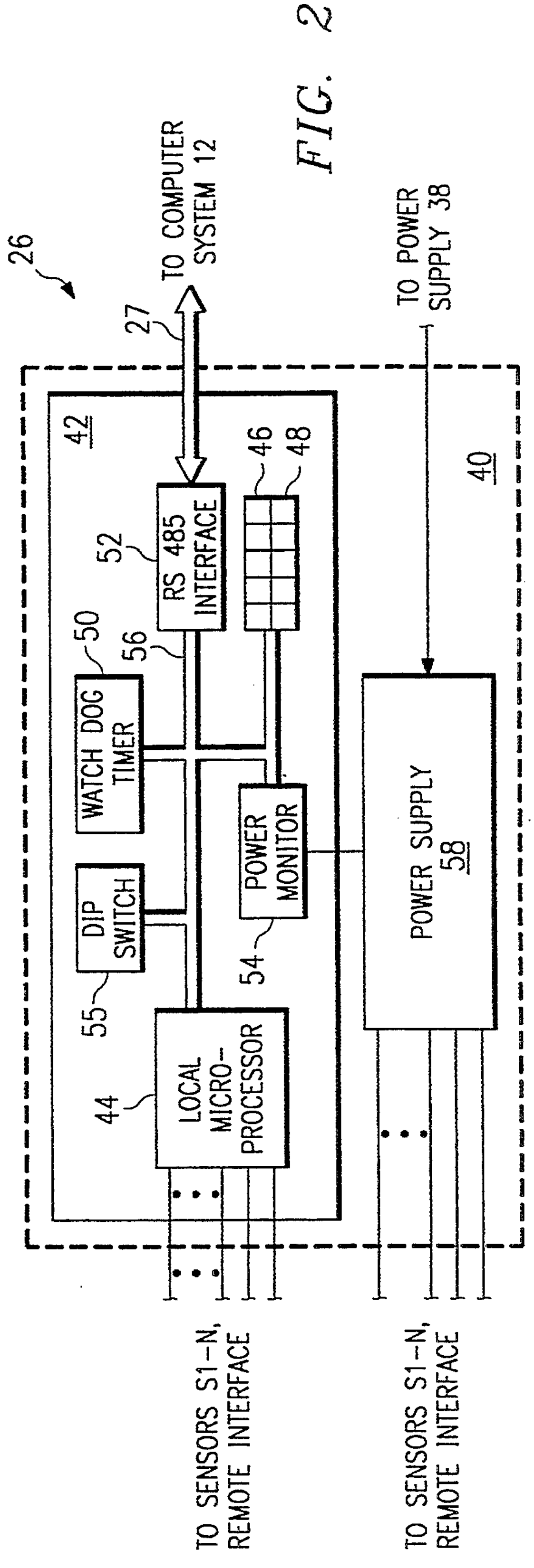
FIG. 2 is an expanded block diagram of an alarm interface portion of the computer-based notification system of FIG. 1.

Referring next to FIG. 2, an expanded block diagram of the alarm interface 26 may now be seen. The alarm interface 26, which preferably is housed in a water and fire resistant steel housing 40, includes a system board 42 having a microprocessor 44, for example, a type 8051 microprocessor manufactured by Intel Corporation of Santa Clara, Calif., first and second data registers 46 and 48, a watch dog timer 50, an RS 485 type interface 52 and a power monitor 54, all of which are interconnected by a common system bus 56. It should be noted, however, in an alternate configuration of the invention, the watch dog timer 50 may be incorporated into the microprocessor 44. The alarm interface 26 further includes a power supply 58 interconnected with the standby power supply 38. The power supply 58 provides 12 volt DC power to the sensors 28-1 through 28-N as well as to the system board 42.

The alarm interface is connected to the computer system 12 by a two-wire cable 27 interconnected between a serial port of the computer system 12 and the RS 485 interface 52 of the system board 42. It should be noted, however, that while the alarm interface 26 is illustrated as having a single system board 42 for collecting data from the sensors 28-1 through 28-N, it is specifically contemplated that the alarm interface 26 may include any number of system boards 42, each identically connected to the two-wire cable 27. Such a configuration is made possible by the dip switches 55, each of which is set such that the system boards 42 are individually addressable by the computer system 12.

Figure 3:
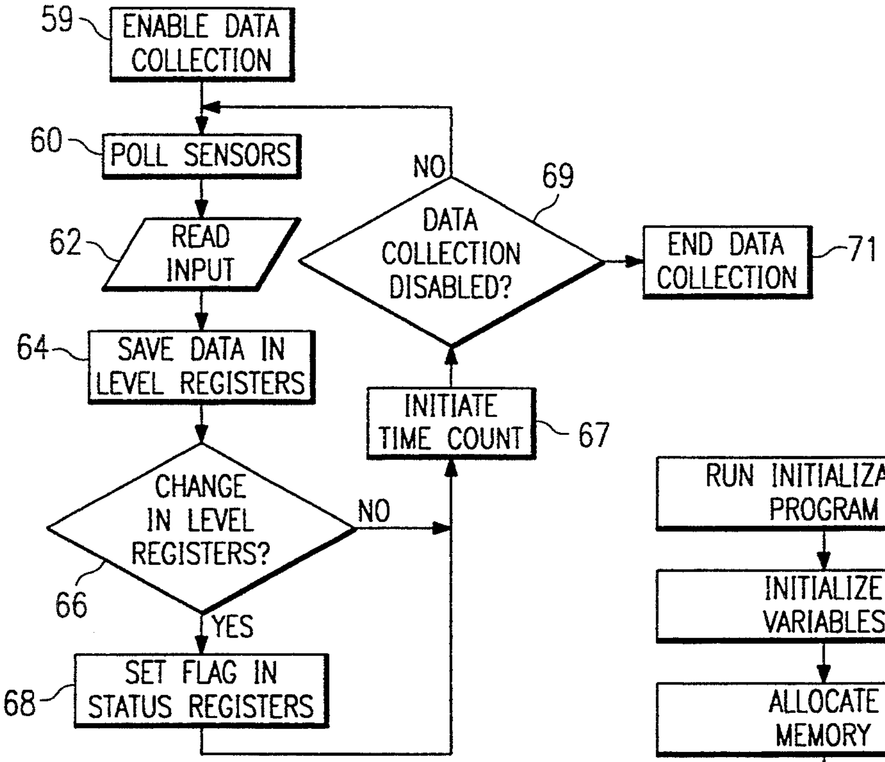
FIG. 3 is a flowchart illustrating a method by which the alarm interface of FIG. 2 collects data from the various sensors incorporated as part of the computer-based notification system of FIG. 1.

Referring next to FIGS. 2 and 3, the method by which the alarm interface 26 collects data for transfer to the computer system 12 will now be described in greater detail. The first (or "level") register 46 and the second (or "status") register 48 are each configured to include a single bit block for each sensor 28-1 through 28-N and a single bit block for the power monitor 54. When the notification system 10 is enabled at step 59, which, as more fully described below, occurs when the notification application 22 enters a monitor loop of the control program portion thereof, the collection of sensor data by the alarm interface 26 commences at step 60 by the microprocessor 44 polling each of the sensors 28-1 through 28-N to determine its state. Proceeding to step 62, the microprocessor 44 reads in data from each of the sensors 28-1 through 28-N. For switch type sensors, the state of the sensor will either be open or closed and may, therefore, be represented by either a logical 0 or a logical 1. For other sensors, for example, temperature sensors, the state of the sensor will either be above or below a pre-selected threshold value. For such sensors, the microprocessor 44 will read in the sensor value, compare the value to the preselected threshold value and determine whether the received value is above or below the preselected threshold value.

Proceeding to step 64, the microprocessor 44 stores the state for each sensor 28 in the level register 46 and, at step 66, the microprocessor 44 determines if the values stored in the level register 46 have changed. If the state of all of the sensors 28 have remained the same, the watchdog timer 50 initiates a selected time count, for example, 10 milliseconds, at step 67 and, at the expiration thereof, a next polling of the sensors 28-1 through 28-N is initiated. If, however, the state of any of the sensors 28-1 through 28-N has changed, the microprocessor 44 sets a corresponding flag bit of the status register 48 before initiating the time count at step 67. By doing so, an alert may be determined by the computer system 12 whenever one of the sensors 28-1 through 28-N changes states, even if that sensor returns to its normal state by the time the data collected by the alarm interface 26 is transferred to the computer system 12. Before initiating a next polling of the sensors 28-1 through 28-N, enablement of data collection is checked at step 69 and, if disabled, data collection ends at step 71.

In contrast to the polling of the sensors 28-1 through 28-N, the power monitor 54 monitors the level of power supplied by the power supply 58. More specifically, the power monitor 54 compares the power level to a preselected threshold value, and changes the value of the power bit of the level register 46 from a logical 1 to a logical 0 if the power level drops below the threshold value. If the power level has not returned above the threshold value when the microprocessor 48 performs a next comparison of the contents of the level register 46 to the prior contents thereof, the microprocessor 48 sets the power bit of the status register 48.

Furthermore, by adjusting the time period between successive pollings of the sensors 28-1 through 28-N, the sensitivity of the sensors may be adjusted. More specifically, if a sensor changes its state and then returns to its original state before the next polling of the sensor by the microprocessor 48, the state change will remain undetected. Accordingly, by reducing the time period between successive pollings of that sensor, the system is more sensitive to state changes of relatively brief duration. Furthermore, while it was previously stated that the time period between successive pollings was the same for all of the sensors, it is further contemplated that, by varying the time period between successive pollings for various ones of the sensors 28-1 through 28-N, the sensitivity of each sensor may be individually set.

Figure 4:
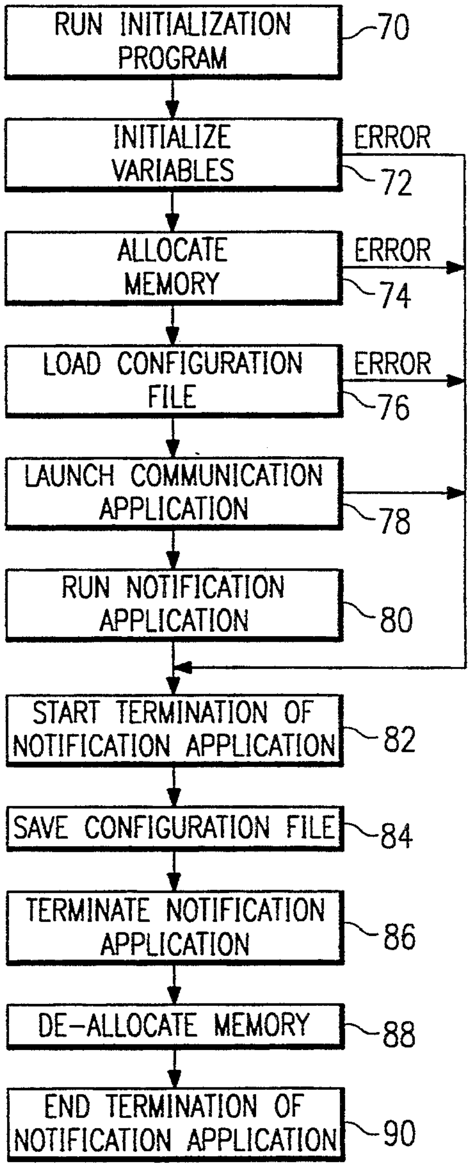
FIG. 4 is a flowchart illustrating a method by which a notification application for reporting the occurrence of events in accordance with the teachings of the present invention is loaded onto a computer system portion of the notification system of FIG. 1.

Referring next to FIG. 4, the method by which the notification application 22 monitors a structure having the sensors 28-1 through 28-N positioned at various locations thereat, determines whether a notification is to be performed, selects a particular notification sequence to be performed and initiates the selected notification sequence will now be described in greater detail. As previously set forth, tile notification application 22 is launched from tile platform 20. Once launched, initialization of the notification application 22 commences at step 70 and, at step 72, program variables for the notification application 22 are initialized in RAM.

Proceeding to step 74, a portion of the main memory of the computer system 12 is allocated for the internal databases associated with the notification application and presently stored in the auxiliary memory and the allocated portion of the main memory cleared. Continuing to step 76, configuration information for the notification application 22 is loaded into the allocated portion of the main memory of the computer system 12. As will be more fully described below, the configuration information now loaded into main memory includes phone numbers, sensor information and other data for performing notifications.

Having loaded the configuration information into the main memory of the computer system 12, the initialization of the notification application 22 is completed at step 78 with the launching of the communication application 24. If, however, an error is detected during any of the steps of the initialization program, the notification application 22 immediately proceeds to step 82 where termination of the notification application 22 is initiated.

Returning to step 78, if the communication application 24 is successfully launched, the initialization program is complete and the method proceeds to step 80 where the notification application 22 is run. After completing usage of the notification application 22, termination of the application may be initiated at step 82. Proceeding to step 84, the configuration file containing the latest version of the phone numbers, sensor information and other data necessary for performing notifications is saved to auxiliary memory and, proceeding to step 86, the notification application 22 is terminated. The previously allocated portion of main memory is deallocated at step 88 and, at step 90, the termination of the notification application 22 is complete.

Figure 5:
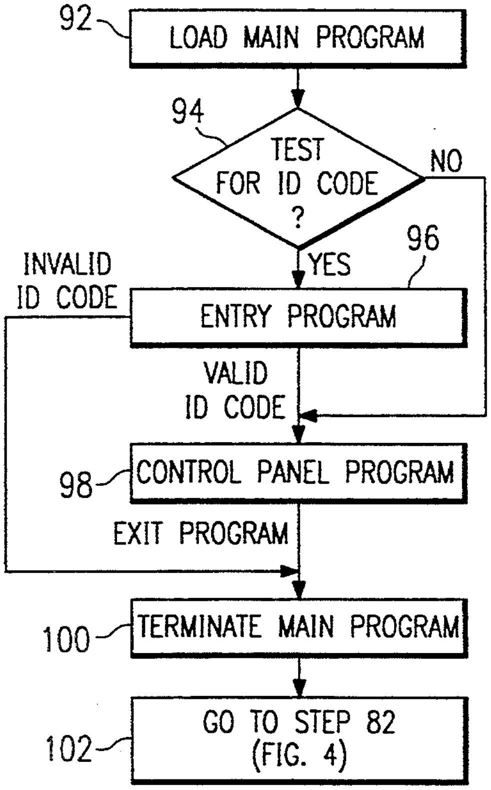
FIG. 5 is an expanded flowchart of a main program block of the flowchart of FIG. 4.

Referring next to FIG. 5, the operation of the notification application 22 will now be described in greater detail. The notification application is initiated at step 92 with the loading of the main program portion of the notification application 22. As more fully described below, the main program includes an entry program and a control panel program. Proceeding to step 94, if the main program has been initialized to require a user identification code for entry therein, the entry program is run at step 96. If, however, the main program has been initialized such that an identification code is not required, the main program proceeds to step 98 where the control panel program is run instead. Upon exiting the control panel program after completing usage thereof, the main program proceeds to step 100 where the main program is terminated. Continuing to step 102, the notification application 22 returns to step 82 where, as before, termination of the notification application 22 is initiated.

Returning momentarily to step 96, if the main program has been initialized to require an identification code and the user enters a valid ID code to the entry program at step 96, the control panel program is entered. If, however, the user enters an invalid identification code to the entry program, the entry program is exited and the main program terminated at step 100 without the user ever entering the control panel program. As before, upon termination of the main program at step 100, the notification application 22 proceeds to step 102 where it is returned to step 82 for the termination of the notification application 22.

Figure 6A:
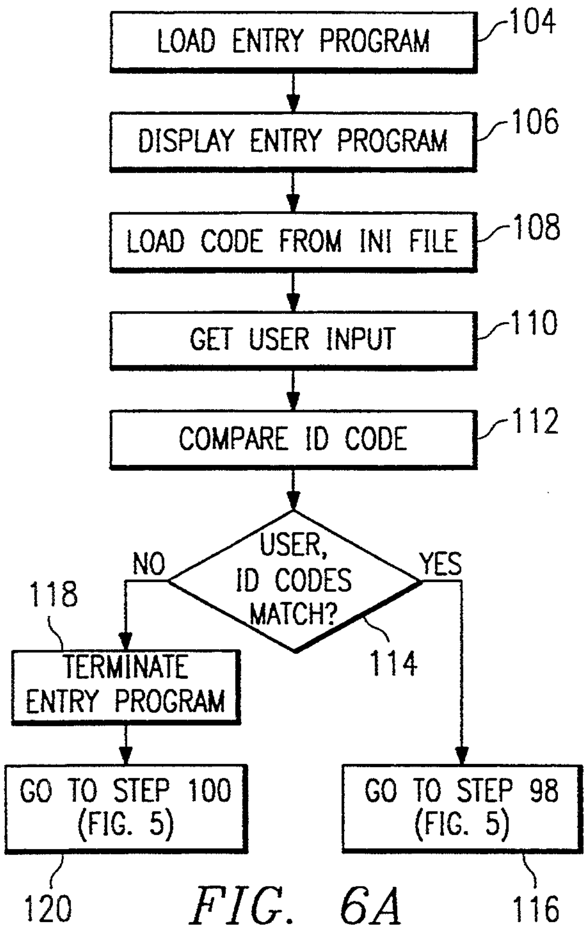
FIG. 6A is an expanded flowchart of an entry program block of the main program of FIG. 5.
Figure 6B:
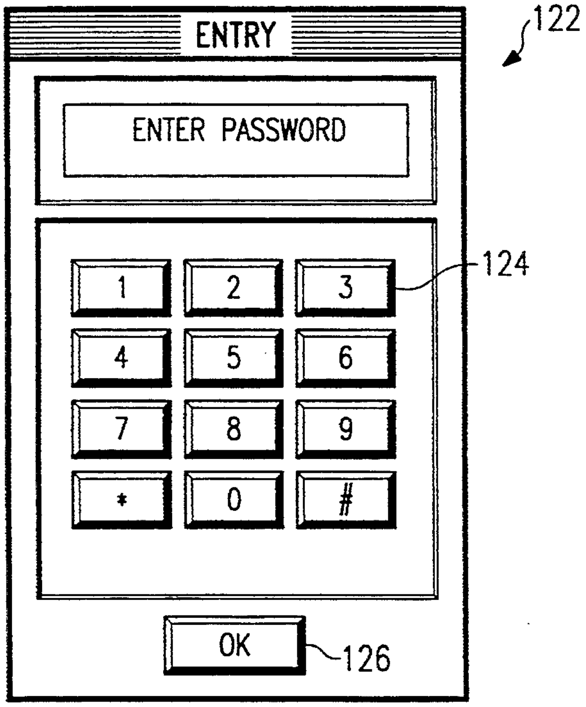
FIG. 6B illustrates a graphical user interface (or "GUI") for user access to the entry program of FIG. 6A.

Referring next to FIGS. 6A–B, the entry program portion of the notification application 22 which is run at step 96 if the main program has been initialized to require a user identification code will now be described in greater detail. At step 104, the entry program is loaded and, at step 106, an entry program GUI 122 illustrated in FIG. 6B and configured to resemble a keypad is displayed on the video monitor 14. The entry program GUI 122, which provides user access to the entry program, includes a series of buttons 124 which may be selectively depressed to enter an identification code into the entry program and a button 126 which may be depressed to indicate that entry of the identification code is complete.

Returning to step 108, the identification code is transferred from the initialization file stored in main memory to the entry program and, at step 110, the user inputs an identification code to the entry program using the user access GUI 122. At step 112, the entry program compares the identification codes from the initialization file and the user. If the entry program determines at step 114 that the identification codes match, the entry program proceeds to step 116 where the entry program continues on to step 98 to run the control program. If, however, the entry program determines that the identification codes do not match, the entry program proceeds to step 118 where the entry program terminates and continues on to step 100 where the main program is terminated.

Figure 7A:
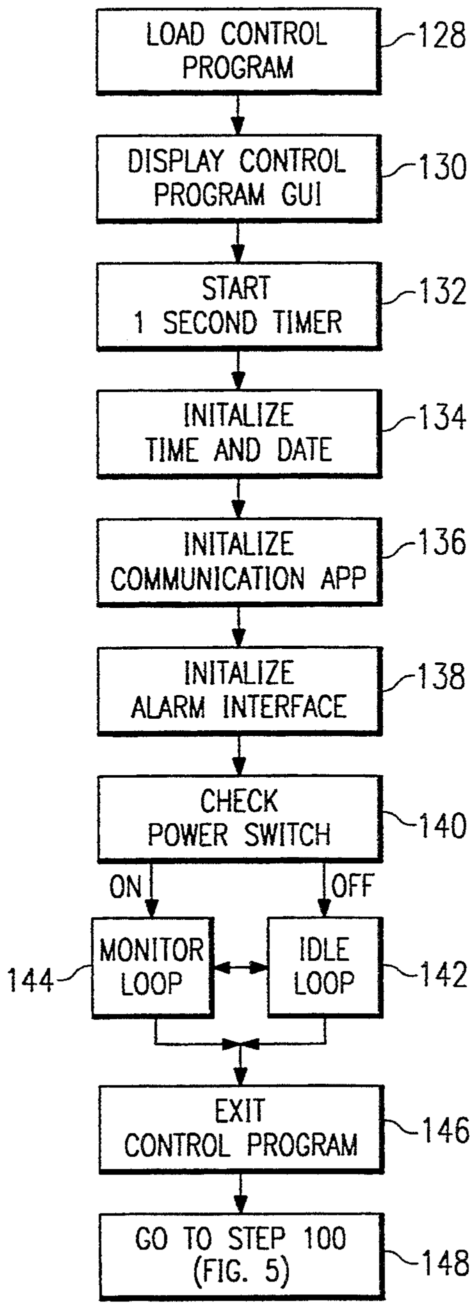
FIG. 7A is an expanded flowchart of a control panel program block of the main program of FIG. 5.
Figure 7B:
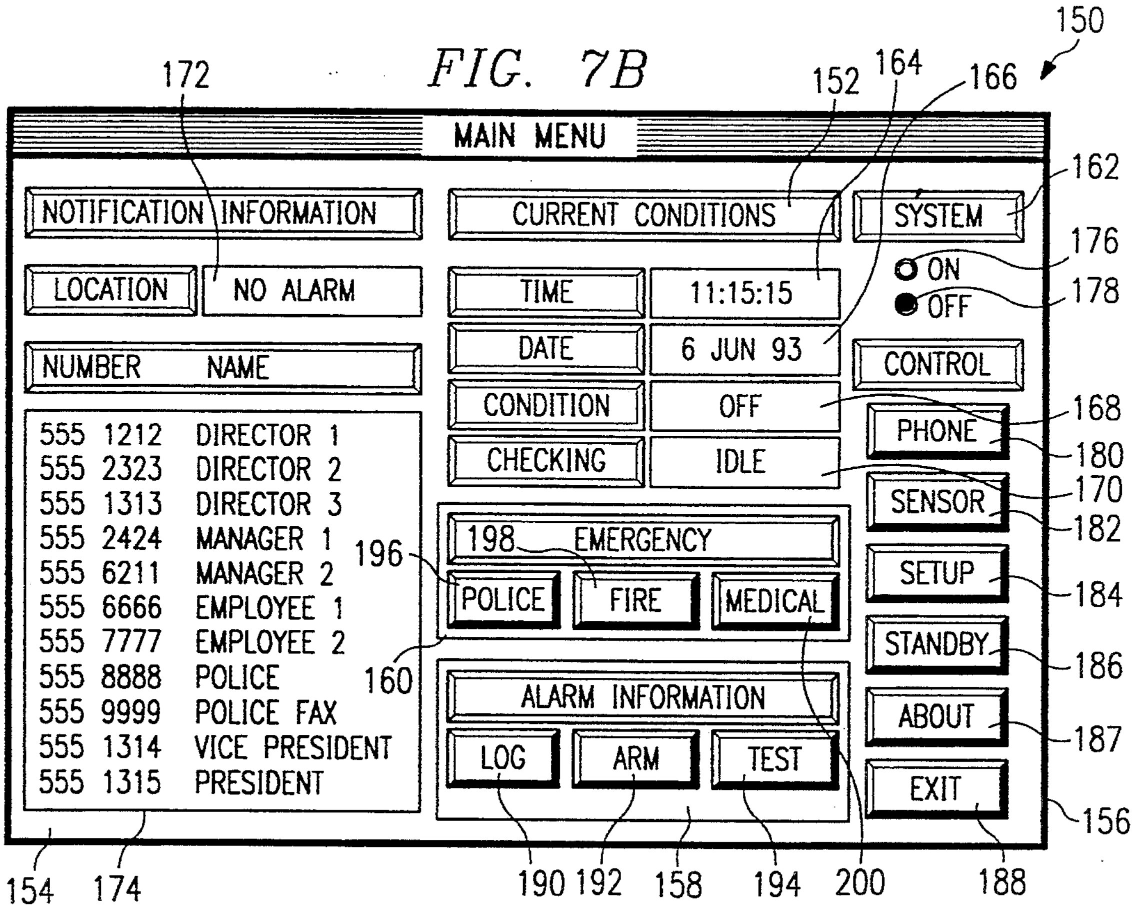
FIG. 7B illustrates a GUI for user access to the control panel program of FIG. 7A.

Referring next to FIG. 7A, the control program portion of the main program will now be described in greater detail. At step 128, the control program is loaded and, at step 130, a control panel GUI 150 for providing a user interface with the control program and illustrated in FIG. 7B is displayed on the video monitor 14. Proceeding to step 132, the control program starts a one second timer and, at step 134, initializes the notification system 10 with the correct time and date. The control program then initializes the communication application 24 and the alarm interface 26 at steps 136 and 138, respectively. Continuing on to step 140, the control program checks to see whether system ON/OFF switch 162 which controls whether the notification application 22 is monitoring the sensors 28-1 through 28-N is "on", i.e. ON button 176 of the control program GUI 150 was last depressed by the user or "off", i.e. OFF button 178 of the control program GUI 150 was last depressed by the user. If the system ON/OFF switch 162 is off, the control program enters idle loop 142 where the user may modify the configuration of the notification system 10 and if the system ON/OFF switch 162 is on, the control program enters monitor loop 144 where the control program monitors the sensors 28-1 through 28-1. The control program may be repeatedly switched between the idle and monitor loops 142, 144 by repeatedly depressing the ON and OFF buttons 176, 178. The control program may also be exited from either the idle or monitor loops 142, 144 by depressing an exit button 188 of the control program GUI. Upon exiting the control program at step 146, the main program returns to step 100 for termination thereof in the manner previously described.

Referring next to FIG. 7B, the control program GUI 150 which is displayed on video monitor 14 by the notification application 22 after the control program has been loaded and which provides a user interface with the control program will now be described in greater detail. The control panel 150 includes six information blocks, four of which are also interfaces with the notification application 22. The current conditions block 152 includes first, second, third and fourth displays 164, 166, 168 and 170 in which the time, date, condition of the notification system 10 and the sensor 28-1 through 28-N being checked at a particular time are respectively displayed. Of these, the third (or "condition") display 168 identifies whether the system is on or off, i.e., the notification application 22 is enabled for the collection of data from the sensors 28-1 through 28-N, or disabled from being able to collect data from the sensors 28-1 through 28-N. The fourth (or "checking") display 170 provides a real-time display of which of sensor 28-1 through 28-N is being checked for an alarm condition at any given time. For example, if sensor S0002 was being checked by the notification application 22 examining the particular bit of the level and status registers 46, 48 which contain information as to whether an alarm condition has occurred at sensor S0002, the checking display 170 would read "S0002".

The second information block which does not provide an interface with the notification application is notification information block 154. The notification information block 154 includes a alarm location display 172 and a notification listing 174. The alarm location display 172 indicates the location of a detected alarm condition. For example, if sensor S0001 was the sensor located at the main entrance of the structure being monitored when an alarm condition was generated for that sensor, the alarm location display 172 would change from "NO ALARM" to "MAIN ENTRANCE", the location of sensor S0001.

The notification information block 154 lists the phone number and name of each person and/or emergency agency to be called when an notification sequence is initiated in response to the detection of an alert condition. More specifically, the notification information block 154 lists the name and number of the first eleven persons and/or emergency agencies who receive, in sequence, a notification of the detection of an alarm condition by the notification application 22. It should be clearly understood, however, that the notification information block 154 only has sufficient room to list the first eleven recipients of a notification during a notification sequence and is not intended to provide a complete list of notification recipients. Rather, it is specifically contemplated that the notification sequence may include additional recipients not displayed in the notification information block 154. It is further noted that the information contained in the notification information block 154 is merely an abbreviated display of the information regarding the notification recipients which is utilized to generate the sequence of notifications.

The control display 150 also includes four interfaces with the notification application 22. As previously described, the system ON/OFF switch 162 includes an ON button 176 and an OFF button 178 by which the user may selectively enable or disable the collection of sensor data by the notification application 22 by depressing the desired button 176 or 178, for example, by "pointing" and "clicking" the desired button. Of course, in addition to disabling or enabling the collection of sensor data by the notification application 22, the condition and checking displays 168,170 would be updated to reflect the state change.

Control interface 156 provides an interface from which the user may add, delete, modify or update phone numbers, sensor information and/or operating parameters for the notification system 22 by depressing the phone, sensor and setup buttons 180, 182, or 184, respectively. It should be noted, however, that while the phone, sensor and setup functions initiated by depressing the phone, sensor and setup buttons 180, 182, 184, respectively, may be used to add new information irregardless of which state the system ON/OFF switch 162 is in, these functions can be used to modify existing information only when the system ON/OFF switch 162 is in the off position. Further details regarding the information contained within the phone, sensor and setup functions will be set forth below.

The user may also return to the windows application, either by depressing standby button 186 to minimize the notification application 22 while still running the application or by depressing exit button 188 to terminate the notification application 22 itself. Finally, additional information regarding the notification application 22 may be displayed by depressing about button 187.

From alarm information interface 158, the user may review a log of all alarms issued by the notification application 22 by depressing log button 190 to initiate a log function. The log contains a list of all alarm conditions detected by the notification application 22 and notification sequences initiated in response to the detected alarm conditions. Each logged detected alarm condition or notification is also appended with the date and time at which it occurred. By depressing arm button 192, the user can arm the system. Finally, by depressing test button 194, the user can initiate a test of the notification system 10. When selected, the test button 192 initiates an alert condition notification sequence identical in configuration to a typical notification sequence.

The emergency interface 160 includes police, fire and medical buttons 196, 198, 200 for notifying police, fire and medical personnel, respectively, of an emergency condition. These particular notifications differ from the primary notification sequence described herein in that only the particular emergency agency selected by the user is notified. As further described below, when an emergency notification is issued, the notification application 22 retrieves a phone number and voice message for the selected emergency notification, builds a message block using the phone and message information and transmits the message block to the communication application 24. Using the provided message block, the communication application 24 dials the selected emergency agency and, once achieving a phone connection with the selected emergency agency, transmits the voice message over the phone line. If enabled, a facsimile message for the selected emergency agency may also be transmitted to a facsimile machine for that agency.

Figure 8A:
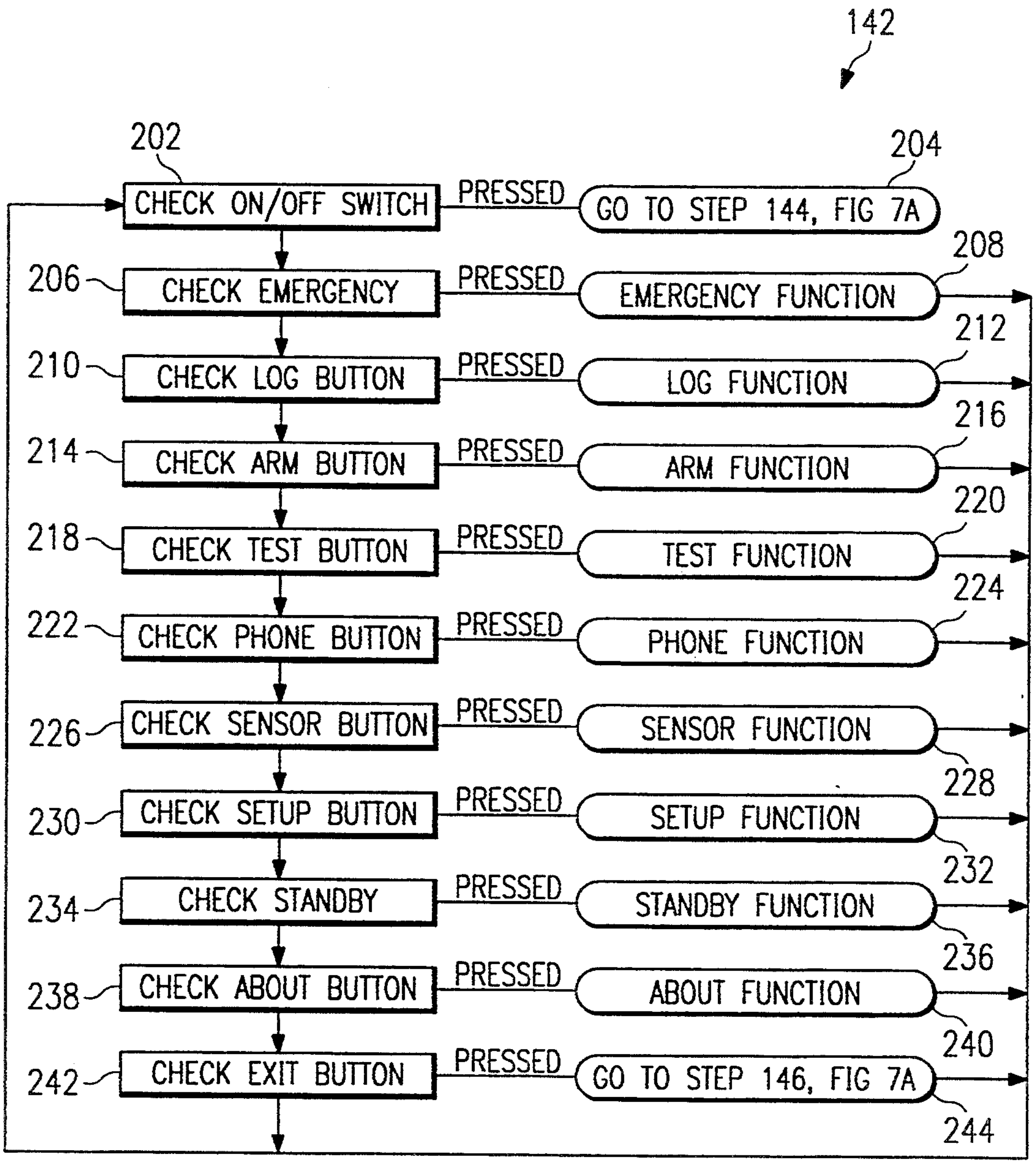
FIG. 8A is an expanded flowchart of an idle loop portion of the control panel program of FIG. 7A.

Referring next to FIG. 8A, the idle loop 142 will now be described in greater detail. During the idle loop 142, which is entered by depressing the OFF button 178, the control program systematically checks to see if any of the control interfaces accessible from the control program GUI 150 have been selected. The idle loop 142 first checks at step 202 to see if the ON switch 176 has been pressed. If the ON switch 176 has been pressed, the control program enters the monitor loop at step 204 and returns to step 144. If the ON switch 174 has not been pressed, the process continues to step 206 where the emergency interface 160 is checked to see if any of the police, fire or medical buttons 196,198, or 200 have been pressed. If the any of these buttons have been pressed, the control program enters the emergency function at step 208 where an immediate notification to the selected emergency agency is initiated. After completing the selected emergency notification, the control program returns to step 202.

Figure 10:
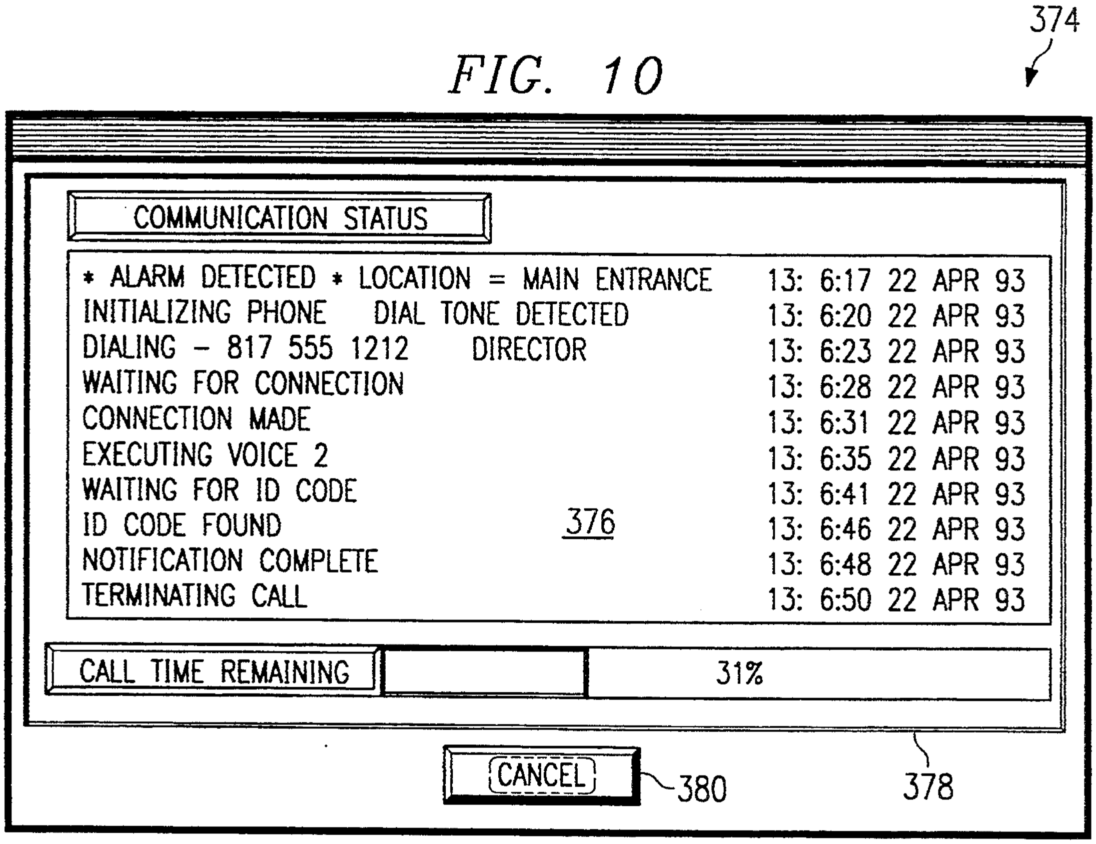
FIG. 10 is a notification dialogue displayed during the notification function of FIG. 9A.

If none of the buttons 196,198 or 200 of the emergency interface 160 have been pressed, the idle loop proceeds to step 210 where the control program checks to see if the log button 190 has been pressed. If so, the control program enters the log function at step 212. The log function provides a list of all alarm conditions detected by the notification application 22 and notification sequences initiated in response to the detected alarm conditions. For example, while FIG. 10 illustrates a real time execution of a notification sequence, each of the steps of the illustrated notification sequence—location of alarm detection, phone initialization, number and person dialed, connection, voice, facsimile, pager or data execution, request for and/or receipt of id code, termination of call, and termination of notification sequence are identically stored in the log. Upon exiting the log function, the control program returns to step 202.

If the log button 190 was not pressed at step 210, the control program checks the arm button 192 at step 214 and the test button 194 at step 218 to see if either had been depressed. If either were depressed, the control program will enter the previously described arm function at step 216 or the test function at step 220, respectively. Upon exiting the arm or test functions, the control program returns to step 202. If neither the arm button 192 nor the test button 194 were depressed, the control program proceeds to step 222 where it checks to see if the phone button 180 has been pressed. If pressed, the control program enters the phone function at step 224.

Figure 8B:
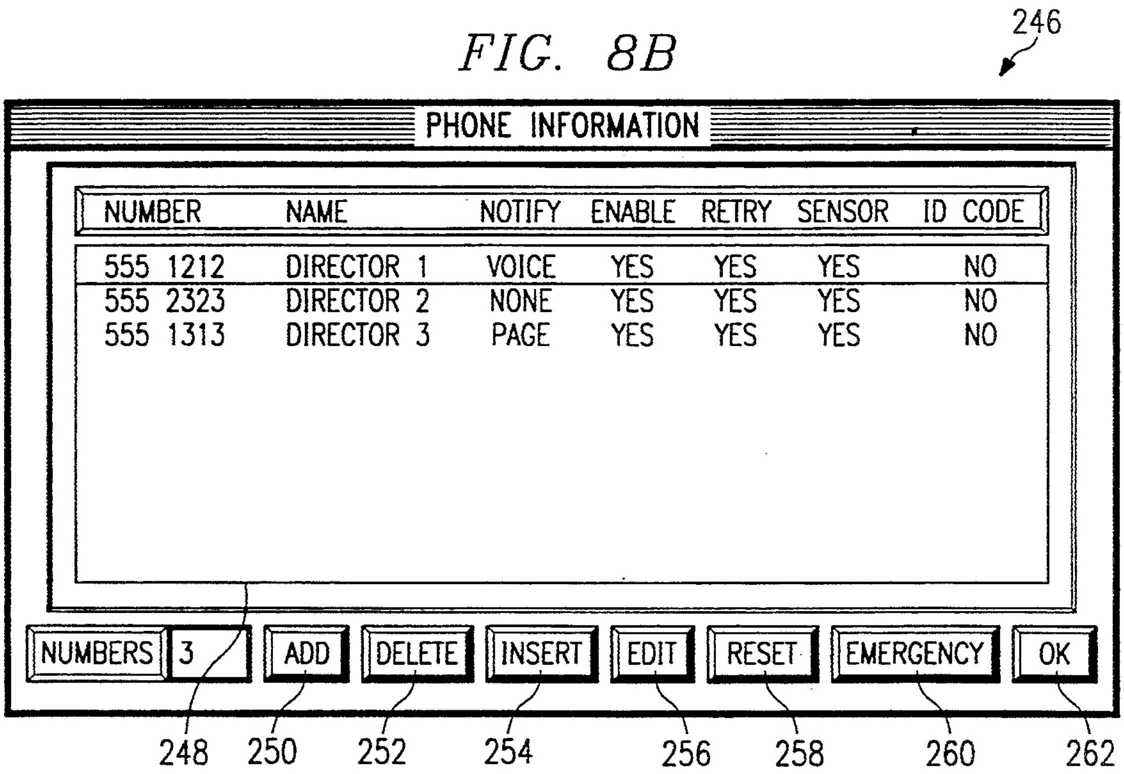
FIG. 8B is a GUI for user access to a phone function of the idle loop of FIG. 8A.

Referring next to FIG. 8B, a phone function GUI 246 for permitting the user to interface with the phone function may now be seen. The phone function GUI 246 includes an information block 248 and control buttons 250, 252, 254, 256, 258, 260 and 262. The information block 248 displays a list of all persons and their phone numbers stored in memory by the notification application 22. It is specifically contemplated that any number of persons may be listed in the information block 248 although, for ease of illustration, only three such persons are listed in the information block 248 of FIG. 8B. Each of the persons displayed by the phone function GUI 246 are potential recipients of a notification message to be issued by the notification application in response to an alarm condition. Accordingly, that information necessary to transmit a notification to the listed persons is stored in memory and accessible via the phone function GUI 246.

More specifically, for each listed person, the phone function GUI 246 contains their name, phone number and the type of notification message—pager, voice, facsimile or data—that the listed person is to receive. If the phone function GUI 246 further indicates that the listed persons are enabled, those persons are thusly selected as notification recipients. Also stored in memory and accessible via the phone function GUI 246 is whether the notification application 22 should retry the listed phone number if a successful phone connection is not achieved during the first attempt, whether the message to be transmitted to the selected recipient as part of the notification message to be received thereby is sensor specific, i.e. stored in memory and accessible via a sensor setup function GUI 280 to be more fully described below, and whether the notification application 22 should terminate the notification sequence if the selected recipient of the notification provides a notification sequence termination command to the notification application 22.

Modification of the phone information stored in memory and accessible via the phone function GUI 246 may be accomplished using the control buttons 250 through 262. To add an additional notification recipient to the list, the user should depress the add button 250 to advance to a phone function setup GUI (not shown) where the user may input the name, phone number, notification message type, call retry enablement indicator, sensor specific message enablement indicator, and termination command enablement indicator for the recipient. Finally, the added recipient may be enabled for receipt of the notification messages. After adding the setup information for the new recipient, the user should return to the phone function GUI 246.

Deletion of existing recipients on the notification list may be performed by selecting a recipient and depressing the delete button 252. Alternately, the entire list of existing recipients may be deleted by depressing the reset button 258. To insert a new recipient into the existing list, the recipient immediately above the desired position for the new recipient to be inserted is selected and the insert button 254 depressed to again advance to the phone setup function. As before, setup information for the inserted recipient should be added and the phone setup function exited. An existing phone setup for an existing recipient on the phone list may be revised by selecting the recipient to be revised and depressing the edit button 256. By doing so, the screen again advances to the phone setup GUI. This time, however, the phone setup information for the selected recipient is retrieved with the phone setup GUI. The user may now edit the phone setup information for the selected recipient and exit the phone setup GUI to return to the phone function GUI 246.

To add, delete or modify the information stored in memory regarding the emergency agencies designated as emergency notification recipients, the emergency button 260 should be depressed to advance the user to the emergency setup GUI (not shown). Accessible via the emergency setup GUI are the phone number and facsimile number of police, fire and medical emergency personnel to be called during an emergency notification initiated by depressing the police, fire or medical buttons 196, 198 or 200. If desired, these phone numbers may be modified by pointing to the phone number to be changed and typing in a new phone number using the keyboard 18. In an alternate embodiment of the invention, it is further contemplated that the phone information GUI 246 and the emergency information GUI may be combined into a single GUI. Lastly, to exit the phone information GUI 246, the exit button 262 should be depressed to return to idle loop 142 to step 202.

In an alternate embodiment of the invention, the various notification messages appended to the sensor setup function GUI 280 and listed on the phone function GUI 246 may be accessible via a single location. For example, it is contemplated that all voice and facsimile messages stored in memory may accessible via a notification application setup GUI 281. In this embodiment, the sensor specific message enablement indicator of the phone function GUI 246 may be deleted and replaced with a simple numeric indicator of the specific message included as part of a list of messages of the designated type which are accessible via the notification application setup GUI 281 or other single location, is to be transmitted to the selected recipient. In still another embodiment of the invention, it is contemplated that the phone function GUI 246 be configured such that the notification recipients receive both a first message appended to the notification application setup GUI 281 and a second message appended to the sensor setup GUI 280. This would enable the recipient to receive both a first notification message generic to all sensors and a second notification message specific to the sensor for which an alarm condition has been detected.

Returning momentarily to FIG. 8A, if the phone function button 180 was not depressed at step 222, the idle loop 142 continues on to step 226 where it checks to see if the sensor button 182 has been depressed. If the sensor button 182 has been depressed, the process enters the sensor function at step 228.

Figure 8C:
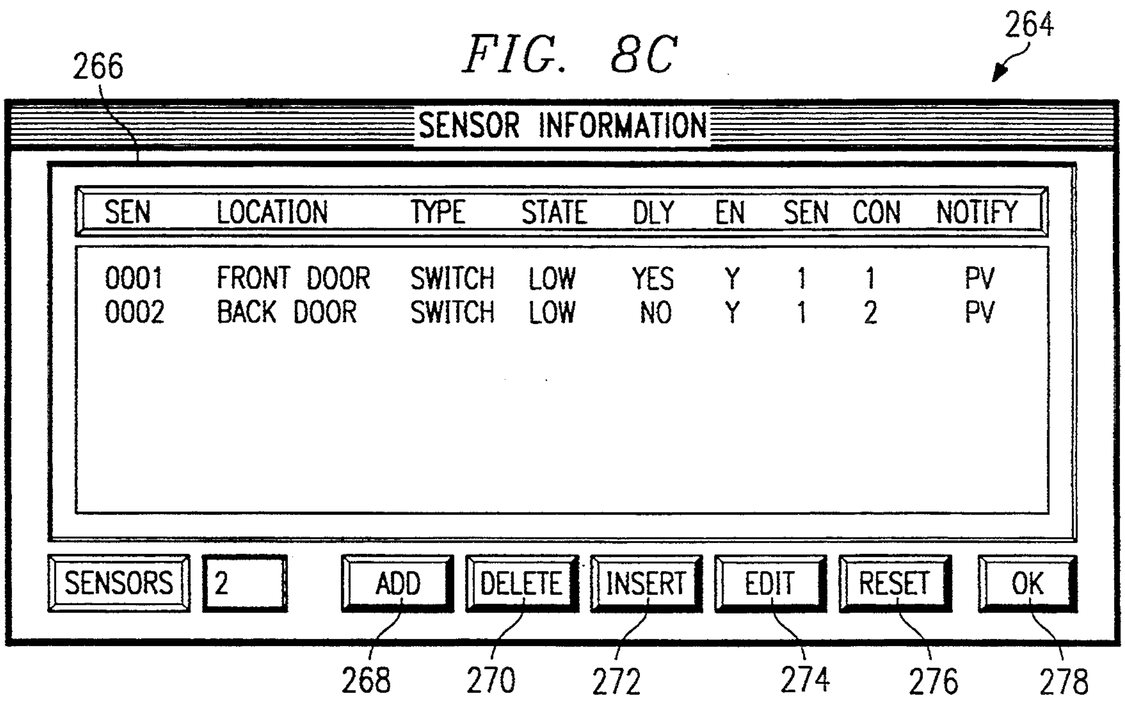
FIG. 8C is a GUI for user access to a sensor function of the idle loop of FIG. 8A.

Referring next to FIG. 8C, a sensor function GUI 264 for providing user access to the sensor function and displayed on the video monitor 14 when the sensor button 182 is depressed will now be described in greater detail. The sensor function GUI 264 includes an information block 266 and add, delete, insert, edit, reset and exit (or "OK") control buttons 268, 270, 272, 274, 276 and 278, respectively. As may now be seen, the information block 266 identifies the number, location and type of each sensor S0001 through S000N monitoring the structure for the occurrence of events. As before, it is specifically contemplated that any number of sensors be listed in the information block 266 although, for ease of illustration, only two such sensors are listed in the information block 266 of FIG. 8C.

The information block 266 further includes state indication means for indicating the state (high or low) of the sensor in the non-alert condition, delay enablement indication means for indicating whether a delay between when the sensor changes state and when the state change is considered to be indicative of an alert condition, enablement indicator means for indicating whether the sensor is enabled, i.e., a change of state will be considered to be indicative of an alarm condition, sensor sensitivity means for indicating the relative sensitivity of the sensor to temporary changes in state, connection indicator means for indicating the total number of electrical connections between the various sensor S0001 through S000N and the alarm interface 26 and, most importantly, message type indication means for indicating which types of notification messages—pager (P), voice (V), facsimile (F) or data (D) have been appended to each sensor, thereby enabling the sensor to issue sensor selective notification sequences.

To add a sensor to the list, the add button 268 is depressed. By doing so, the user is advanced to the sensor setup GUI 280 illustrated in FIG. 8D. The sensor setup GUI 280 provides two interfaces—a notification information interface 282 and a sensor information interface 284. From the notification information interface 282, a page, voice, facsimile and data message may be created, stored and/or enabled.

To create a notification message, for example, a page message, the user enters a code in field 286. Later, when an alarm condition is detected for the sensor corresponding to the particular sensor setup GUI 280 being configured, a page message comprised of the code entered in the field 286 would be transmitted to any person designated on the list of recipients to receive a page message.

To create a voice message, the user depresses voice button 251 to run sound recorder software provided as part of the Windows platform 20. After recording a voice message, the user stores the recorded message at a location in memory. A name and location of the recorded voice message are then entered in fields 288 and 290, respectively. Later, when an alarm condition is detected for the sensor corresponding to the particular sensor setup GUI 280 being configured, a voice message comprised of the message stored at the location entered in the field 290 would be transmitted to any person designated on the list of recipients to receive a voice message.

To create a facsimile message, the user creates a data file at a selected location in memory and enters the name and location of the file in fields 292 and 294, respectively. Later, when an alarm condition is detected for the-sensor corresponding to the particular sensor setup GUI 280 being configured, the data stored at the location entered in the field 292 would be facsimiled to any person designated on the list of recipients to receive a facsimile message. Similarly, to create a data message, the user creates a data file at a selected location in memory and enters the name and location of the file in fields 296 and 298, respectively. Later, when an alarm condition is detected for the sensor corresponding to the particular sensor setup GUI 280 being configured, the data stored at the location entered in the field 298 would be electronically transmitted to any person designated on the list of recipients to receive a data message.

Figure 8D:
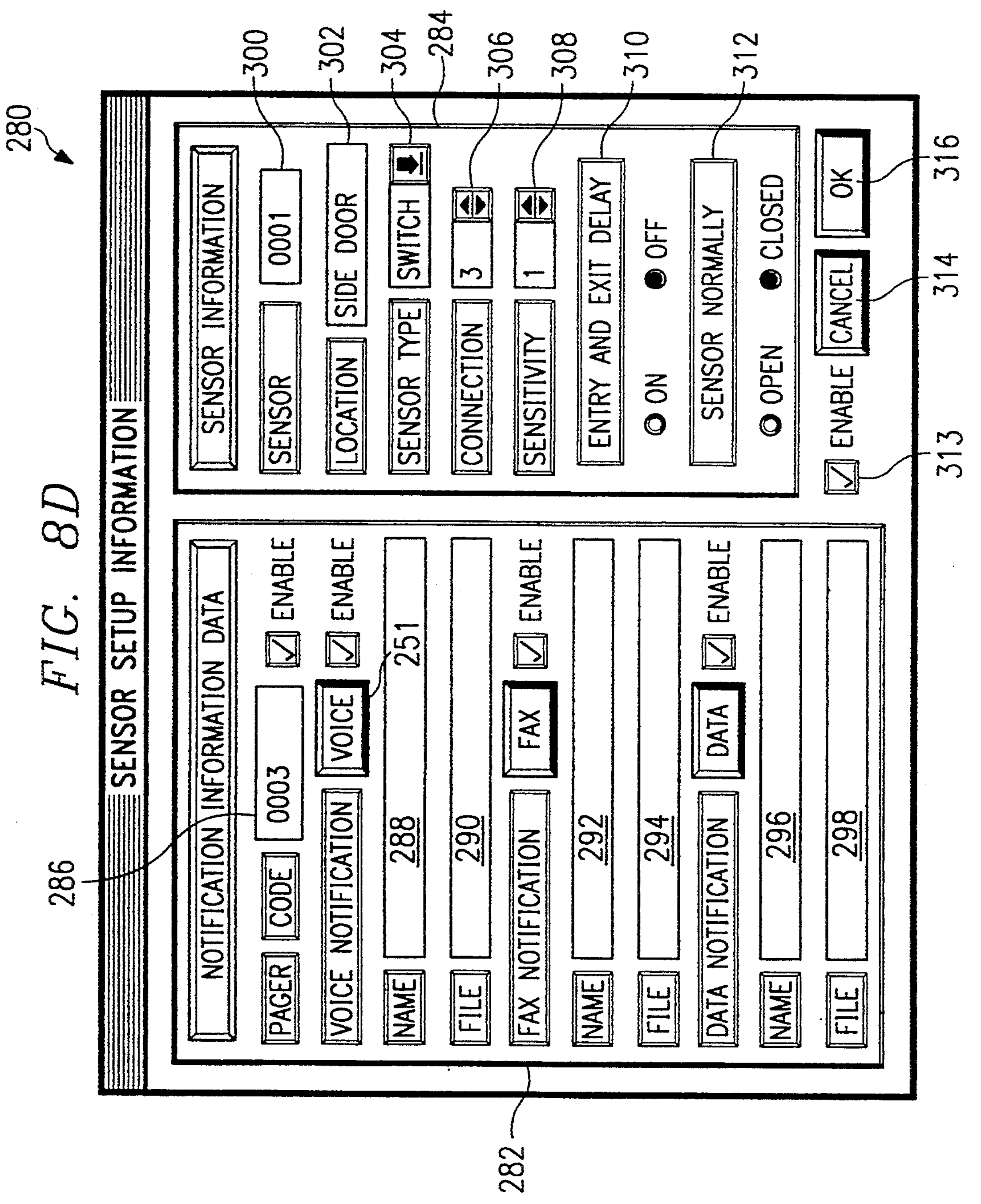
FIG. 8D is a GUI for user access to an add sensor portion of the sensor function of FIG. 8C.
Figure 8E:
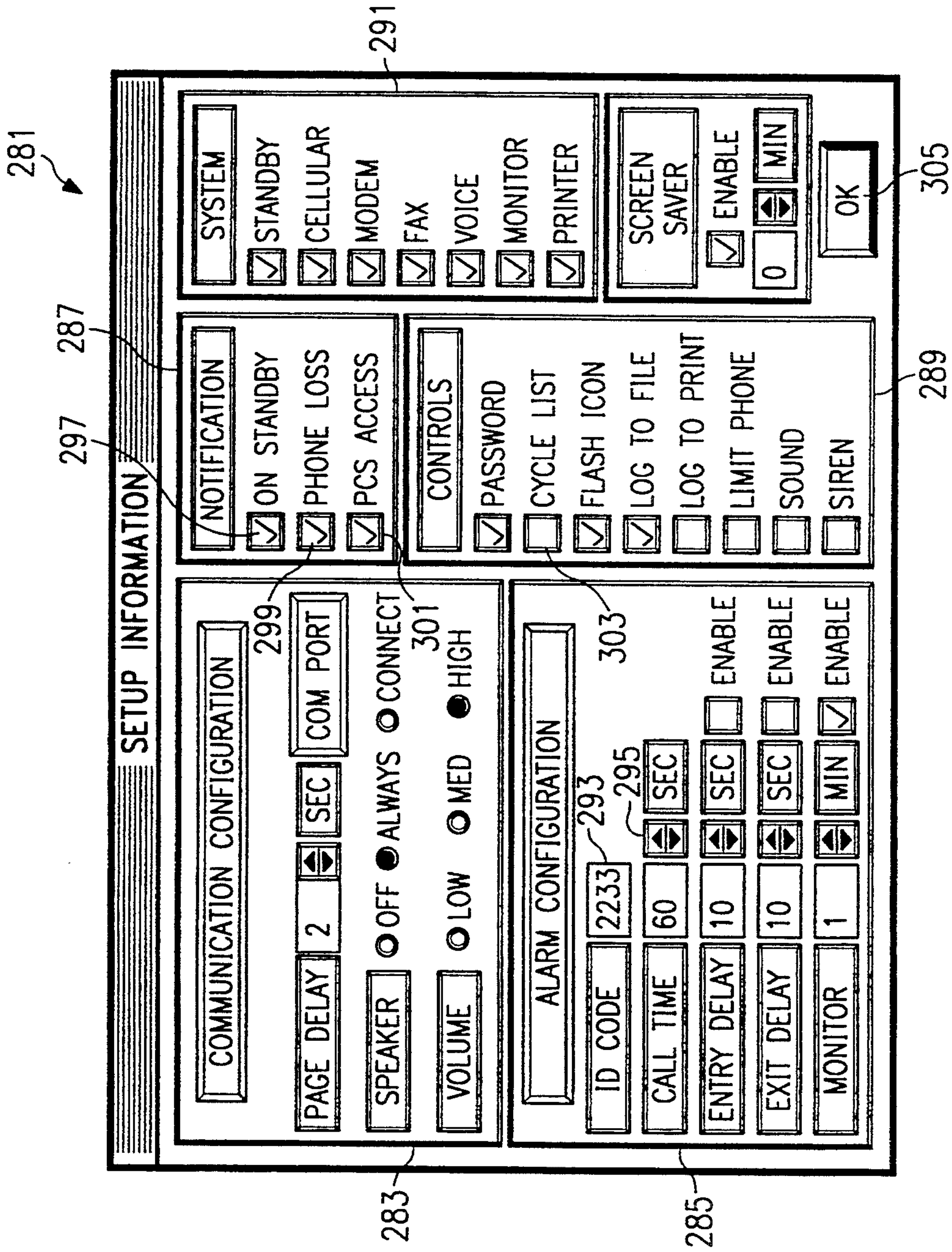
FIG. 8E is a GUI for user access to a setup function of the idle loop of FIG. 8A.

Continuing to refer to FIG. 8D, the sensor interface 284 also included as part of the sensor setup function GUI 280 is used to configure each sensor S0001-S0015. From the sensor interface 284, the sensor number and location may be set by respectively pointing to sensor and location fields 00 and 302 and typing in the number and location of the sensor in the fields 300 and 302. The type of sensor may also be set from the sensor interface 84 by pointing to sensor type box 304 and clicking on one of the specific types of sensors (switch, sound, motion, keypad, temperature, button, radio, video, infrared or entry) listed by the sensor setup GUI 280 in response to the user's pointing to the sensor type box 304. The total number of sensors connected to the alarm interface 26 is set by pointing to connection box 306 and clicking on one of the connection numbers listed by the sensor setup GUI 280. The sensitivity of the sensor being configured by the sensor setup GUY 280 may be selected by pointing to the sensor sensitivity box 308 and clicking on one of the sensor selectivity levels (1 to 100) listed by the sensor setup GUI 280. As previously described, sensor selectivity is related to the frequency of which the state of the sensor is checked. The lower the selected sensitivity level, the more often the state of the sensor will be checked by the alarm interface 26. As a result, the sensor will be more sensitive in detecting relatively brief state transitions which would remain undetected if the state of the sensor were checked much less frequently.

Finally, the sensor information interface 284 includes entry/exit delay, sensor state and sensor enable buttons 310,312 and 313, respectively. By depressing the entry/exit delay button 310, a short delay, typically on the order of 30–45 seconds, during which a state change for the sensor is not determined to be an alarm condition is enabled. By enabling such a delay, a person may enter and exit the monitored structure without triggering an alarm. By depressing the sensor select button 312, the non-alarm condition state is selected for the sensor. For example, if the normally closed state is selected, the notification application 22 will determine the presence of an alarm condition if it detects the sensor entering the open state. By depressing the enable button 313, the sensor is enabled such that an alert condition will be detected when the sensor transitions out of its normal state. By depressing the cancel button 314, the configuration information stored in the sensor information interface 284 is deleted and, by depressing the exit button 316, the user will exit the sensor setup GUI 280 and return to the sensor function GUI 264 and, upon exiting the sensor function GUI 264, return to step 202 of the idle loop 142.

Returning momentarily to FIG. 8A, if the sensor function button 182 was not depressed at step 222, the idle loop 142 continues on to step 226 where it checks to see if the setup function button 184 has been depressed. If the setup function button 184 has been depressed, the process enters the setup function at step 232.

Referring next to FIG. BE, a setup function GUI 281 for providing a user interface with the setup function, will now be described in greater detail. The setup function GUI includes five primary configuration interfaces—communications configuration interface 283, alarm configuration interface 285, notification configuration interface 287, control configuration interface 289 and system configuration interface 291. The primary purpose of the communication configuration interface 283 is to configure operating parameters of the communication card 34 such as baud rate, flow count, carrier detect, parity check and others.

Using the alarm configuration interface 285, the user can set the identification code which terminates the notification sequence if received from a recipient enabled to terminate the notification sequence. To do so, the user points to identification code box 293 and uses the keyboard 18 to place a new identification code in the box 293. The user can also set call time duration, i.e., how long the communication application 24 will await after completing transmission of a notification message to a recipient for the recipient to provide the identification code for terminating the notification sequence. To set call time duration, the user repeatedly depresses call time duration button 295 until the desired call time duration is displayed.

By enabling the standby, phone loss, and/or PCS access buttons 297, 299, or 301 of the notification interface 287, the notification application 22 will initiate a notification sequence if the main power or normal phone line are lost or if the computer system 12 is accessed. The control interface 289 includes a cycle list button 303 which, if enabled, will cause the notification sequence to be performed repeatedly until an identification code is received. When cycling the notification sequence, emergency numbers should be removed from the phone list before the sequence is repeated. Finally, to exit the setup function GUI 281 and return to step 202 of the idle loop 142, exit button 305 should be depressed.

Returning again to FIG. 8A, if the setup button 184 was not depressed, the idle loop 142 then checks the standby button 186. By depressing the standby button 186, the idle loop 142 enters the standby function at step 236 where the notification application 22 is minimized to permit multitasking using the Windows platform 20. Upon restoring the notification application 22, the process returns to step 202 of the idle loop 142. If the standby button 186 was not depressed, the idle loop 142 then checks the about button 187. By depressing the about button 187, the idle loop 142 enters the about function at step 240 where information regarding the notification application is displayed on the video monitor 14. The display includes an exit button which, if depressed, returns the process to step 202 of the idle loop 142. Finally, if the about button was not depressed, the idle loop 142 proceeds to step 242 where the exit button 188 is checked. If the exit button 188 was not depressed, the idle loop 142 returns to step 202 to initiate a next check of the various control buttons accessible from the control panel GUI 150. If, however, the exit button 188 was depressed, the idle loop 142 is exited at step 244 and the process returns to step 146 where the control program is exited.

Figure 9A:
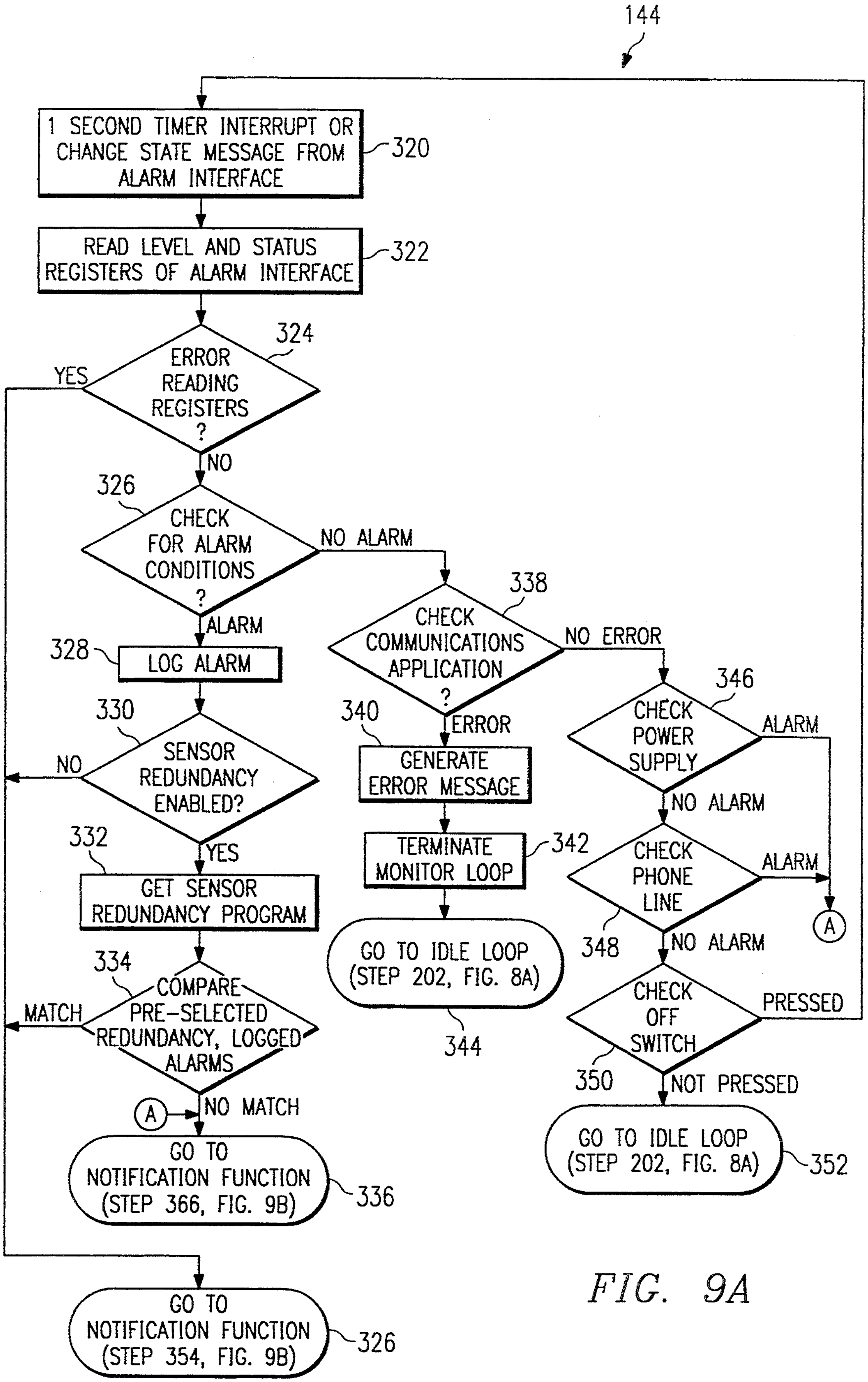
FIG. 9A is an expanded flowchart of a monitor loop portion of the control panel program of FIG. 7A.

Referring next to FIG. 9A, the monitor loop 144 of FIG. 7A will now be described in greater detail. Once entered, for example, by depressing the system on button 178 or the arm button 192, the notification application 22 remains in the monitor loop 144 until the system off button 178 or the application exit button 188 has been pressed. Once entered by the notification application 22, the monitor loop 142 periodically polls the communication application for the level and status for each sensor 28. More specifically, a one second timer is initiated upon entering the monitor loop 142. Thereafter, each time one second has elapsed, or a "change state" message has been received from the alarm interface 26 at step 320, the communication application 24 polls the alarm interface 26 and, at step 322, receives the contents of the level and status registers 46, 48. Upon receipt thereof, the communication application 24 forwards the data from the level and status registers 46, 48 to the notification application 22.

Proceeding to step 324, if an error occurred during the polling process, for example, if the contents of the level and status registers 46, 48 are not received by the notification application 22, the notification application 22 determines that an alert condition has occurred, immediately exits the monitor loop 142 and enters the notification function at step 208. If, however, the level and status registers 46, 48 are successfully read by the notification application 22, the notification application 22 then checks the received level and status data at step 326 for alarm conditions.

More specifically, at step 326, the notification application 22 checks the level data by comparing the received levels (0 or 1) for each sensor S0001–S000N to the normal level (0 if the sensor is normally open and 1 if the sensor is normally closed). The status bit for each sensor S0001–S000N is then checked to see if that bit had been latched since the prior polling. If it is determined at step 326 that either the status bit is latched or the level bit differs from the normal level for that bit, an alarm condition is determined for each sensor S1–SN for which either of these conditions have been detected. The process then proceeds to step 328 where an alarm is logged for that sensor. For example, if sensor S1 is located at the main entrance of the location, the process would log the following message: "*ALARM DETECTED* LOCATION=MAIN ENTRANCE", together with the time and date of the detected alarm in memory.

Upon detection of an alarm, the process proceeds to step 330 where it is determined whether the sensor redundancy feature is enabled for the notification application 22. By the term "sensor redundancy" it is intended to refer to the feature where the mere detection of an alarm at a particular sensor would not necessarily trigger a notification or may only trigger a limited notification. For example, S1 may be a door sensor located at the main entrance of the secured location and $2 may be a pressure sensor located underneath the flooring just inside the secured location at the main entrance. If an alert is detected at S1 by the door at the main entrance being opened, it is entirely possible that the alert was caused by an emergency situation requiring full notification, i.e., an intruder has forced open the door, or by a non-emergency situation not requiring full notification, i.e., the door has been blown open during a thunderstorm. Accordingly, at step 330, the process checks to see if sensor redundancy has been enabled.

If sensor redundancy has been enabled, the process proceeds to step 332 where the sensor redundancy program is retrieved. This program contains a list of individual sensors for which an alarm, by themselves, is indicative of an emergency situation and various other combinations of alarms which are indicative of an emergency situation. For example, the sensor redundancy program may provide that individual alerts issued by S0002 through S00012 and S0014–0015 are indicative of an emergency situation while an alert issued by the sensor S0001 is considered an emergency situation only if an alert is then issued by the sensor S0002.

Proceeding to step 334, if the logged alarm or combination of alarms match one of the individual sensor or sensor combinations listed in the redundancy program as requiring a full notification function, the process proceeds to step 326 where a full notification function is initiated. If, however, the logged alarm or combination of alarms does not match any of the individual sensor or sensor combinations, the process proceeds to step 336 where a limited use of the notification function is initiated. In contrast to a notification function which typically includes automatic notification of emergency personnel, a limited use of the notification function is typically limited to selected company personnel designated to be informed in the event of a non-emergency alert condition.

It is further contemplated that, in one embodiment of the invention, the sensor redundancy program would include time, as well as sensor, requirements. In the previous example, the sensor redundancy program will only indicate that a notification condition has occurred if both sensors S0001 and S0002 have issued alarms. As the time at which each alarm occurs is also logged into memory, the sensor redundancy program may be readily modified to include the time elapsed between alarms when determining whether to issue a notification. For example, the sensor redundancy program may be configured to issue a notification only if both sensors S0001 and S0002 transitioned into an alarm condition and the sensor S0002 transitioned into the alarm condition within a preselected time period, for example, 10 seconds after the sensor S0001 transitioned into the alarm condition.

Returning now to step 326, if none of the sensors S0001–S000N have transitioned into alarm condition, the monitor loop 144 proceeds to step 338 where the communication application is checked for proper operation. If it is determined that the communication application is not functioning properly, i.e., it is unable to complete a phone notification, the communication application 24 transmits an error message to the notification application 22 at step 340, the monitor loop 144 is terminated at step 342 and the process returned to the idle loop 142 at step 344.

Referring again to step 338, if the communication application 24 is operating properly, the process continues to step 346 where the contents of the power bit of the status and level registers 46, 48 are checked in the manner previously described to determine if the main power supply is continuing to supply power to the notification system 10. If power has been interrupted and the notification system 10 is being powered by the standby power supply 38, the process continues to step 336 where a limited notification function is initiated. If, however, it is determined at step 346 that the 120 volt power source is supplying power to the notification system 10, the process continues to step 348 where the cellular phone line is checked. As before, if it is determined that the phone line is not working properly, the process proceeds to step 336 where a limited notification function is initiated and, if the phone line is working properly, the process continues to step 350 where the off switch 178 is checked. If the off switch 178 has been depressed, the monitor loop 144 is exited and the idle loop 142 is entered at step 352.

Figure 9B:
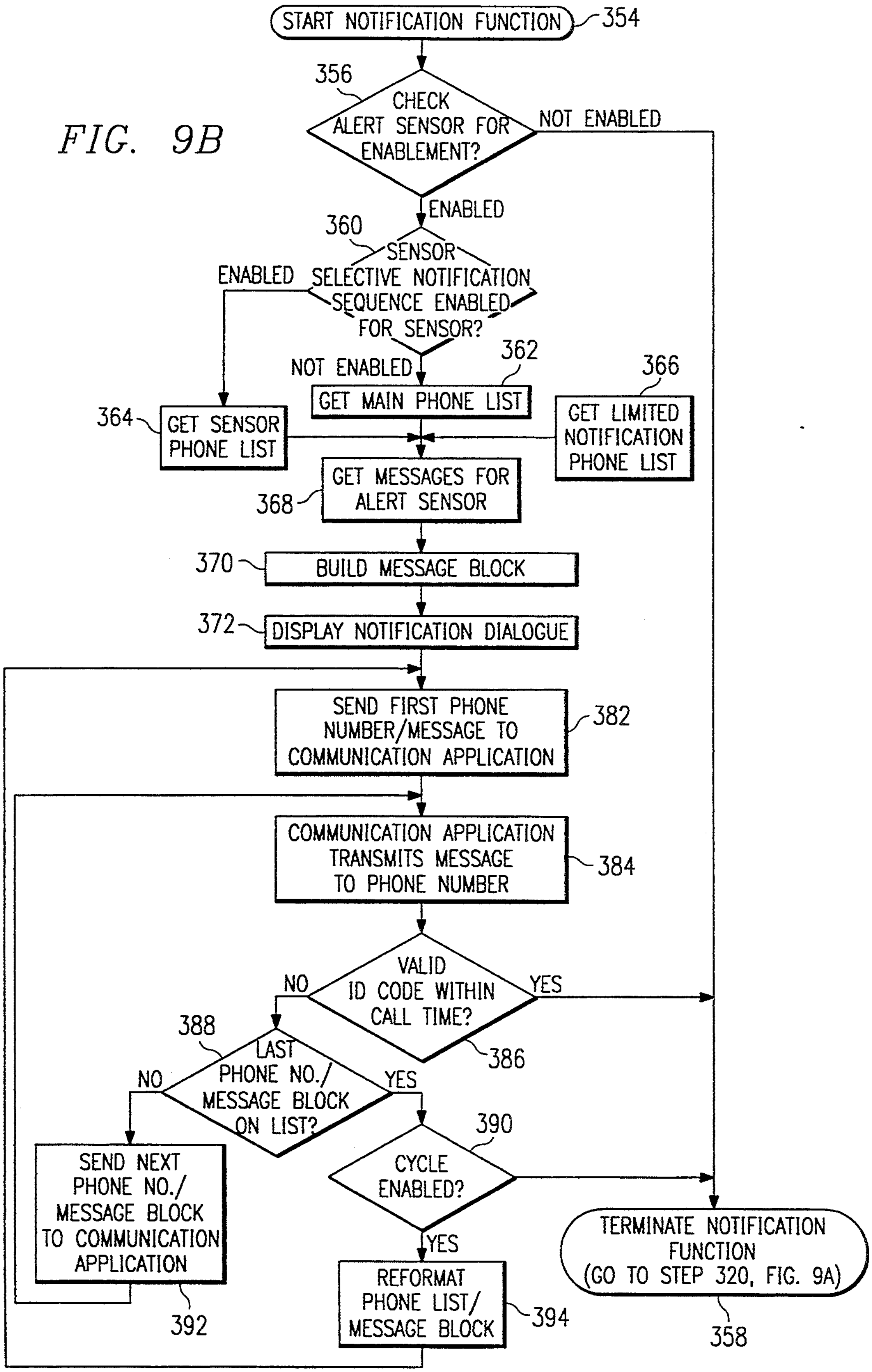
FIG. 9B is an expanded flowchart of a notification function portion of the monitor loop of FIG. 9A.

Referring now to FIG. 9B, the notification function shall now be described in greater detail. As previously described, the notification function commences at step 354 when a sensor enters the alarm condition. At step 356, the notification function checks the sensor, for example, by reviewing the information stored in memory by the sensor function. If the sensor has not been enabled, the notification function proceeds to step 358 where the notification function is terminated and the monitor loop reentered at step 320.

If, however, the sensor which has entered the alarm condition has been enabled, the notification function proceeds to step 360 where it is determined whether a sensor selective notification sequence has been enabled. Like the sensor redundancy feature, the sensor-selective notification feature provides for uniquely associating a particular sensor with a notification sequence. For example, sensor S0003 may be a heat sensor. Accordingly, the preferred notification sequence would be different for that sensor, which is more likely to be considered indicative of a fire, that for a motion detector sensor which is more likely to be indicative of a break-in. A second example is the RF sensor S0005. Such sensors are typically indicative of a medical emergency and, as such, would again have a preferred notification sequence.

If the sensor selective notification function has not been enabled, the process continues to step 362 where the notification function retrieves the main phone list contained in the information block 248 of the phone function 246. If, however, the sensor selective notification sequence has been enabled at step 360, the notification function proceeds to step 364 where a sensor phone list unique to the sensor having entered the alarm condition is retrieved from memory. It is expected that the sensor phone list will be similarly configured to the main phone list with the exception that the particular emergency personnel to be contacted will vary. For example, it is contemplated that a notification function for the majority of the sensors included as part of the notification system 10 will transmit a notification to local police. As the main phone list includes a notification to police, the sensor selective notification sequence will typically be not enabled for these sensors. It is noted, however, that for certain sensors, for example, heat and RF sensors, it is often preferable that the notification be delivered to emergency personnel other than the police. For example, the fire department should be notified of a detection of an alert condition by a temperature sensor while emergency medical personnel should be notified of a detection of an alert condition by an RF sensor.

On the other hand, when the detected alert condition is not considered to be an emergency, a limited notification phone list is retrieved from memory. For example, if an alarm condition is detected by a switch type sensor installed on an interior door, such an alarm may be indicative of a non-emergency condition such as an improperly secured file room door. Accordingly, the notification associated with such a non-emergency alarm should be limited to employees and/or principals of the organization and should not include emergency personnel. Typically, the limited notification phone list differs from the main phone list only in that notifications of emergency personnel have been deleted from the list.

Proceeding to step 368, the notification function retrieves the messages stored by the notification information block 286 of the sensor function 280 configured for the sensor detecting the alarm condition. As previously stated, all messages related to the various sensors may be stored at a single location and/or each sensor may have a pager, voice, facsimile and/or data message associated therewith. From the retrieved phone list and stored messages, the notification function builds a message block containing a list of phone numbers and a message or messages to be transmitted to that phone number at step 370. It is contemplated that the message or messages associated with a single phone number may contain a message accessible from the setup function GUI 281 (and typically suitable for transmission to recipients in connection with alert conditions detected at most or all of the sensors), a message uniquely appended to the sensor entering the alarm condition or both.

Continuing to step 372, the notification function then generates a notification display 374. The notification display 374, which may be seen by reference to FIG. 10, includes a dialogue box 376 in which each current information as to the status of the notification sequence is displayed. The notification display 374 also includes a time indication means for indicating the time remaining for which the phone notification being performed is to be completed and a cancel button 380 which, if depressed, will cancel the notification sequence.

Returning to FIG. 9B, the notification function continues to step 382 where the first phone number and an associated message or messages block is forwarded to the communication application for transmission. Proceeding to step 384, the count time is initiated, for example, by beginning a count down from the maximum time period permitted for completing a phone call to zero. The communication application 24 then checks the phone for a dial tone, displays a message reporting the time at which a dial tone was successfully acquired in the dialogue box 376 and logs the same message in memory. The communication application then dials the phone number of the selected recipient and reports the completion of the dialing to the dialogue box 376 and the log. If the phone is answered, the communication application transmits the message or messages stored in the message block over the phone line and, as before, reports both of these events to the dialogue box 376 and the log. As previously stated, the message to be transmitted by the communication application 24 may either be a pager, voice, facsimile, or data type message and, depending upon the particular type of message to be transmitted to the selected recipient over dialing process, the exact protocol for transmitting the message from the communication application 24 to the selected recipient will differ depending on the particular type of message to be transferred.

Proceeding to step 386, if the communication application 24 receives a valid identification code from the recipient of the delivered message, the notification function will terminate at step 358 and the process will return to step 320 of the notification application 22. If, however, no identification code is received or the phone remains unanswered when the call time counts down to zero, the phone call is terminated and the termination of the call displayed in dialogue box 374 and logged.

Continuing on to step 388, if the phone number dialed Just dialed by the communication application 24 is not the last phone number on the phone list, the notification function proceeds to step 392 where the next phone number and message or messages on the list is sent to the communication application 24 for transmission. The notification function then returns to step 384. If, however, the phone number just dialed by the communication application is the last phone number on the phone list, the notification function proceeds to step 390. At step 390, the notification function determines if the cycle function has been enabled. If it has, the notification function continues to step 394 where the phone list and associated message or messages are reformatted to delete the emergency personnel (police, fire, medical) listed on the phone list and to reformat the phone list and associated message or messages using the remainder of the recipients listed on the phone list. The notification function then returns to step 384 where a next cycle of notifications to selected recipients is initiated. Cycling notifications of selected recipients will continue until one of the recipients transmits the identification code to the notification function necessary to terminate the operation. If, however, cycle redundancy is not enabled, the notification function is terminated at step 358 and the notification function returns to step 320.

The foregoing detailed description is to be clearly understood as being given by way of illustration and example only, the spirit and scope of the present invention being limited solely by the appended claims.

What is claimed is:

1. A computer-implemented method of issuing a notification of an occurrence of an event within a defined area having a plurality of sensors positioned therein comprising the steps of:

configuring each of said plurality of sensors as either a non-redundant type sensor or a redundant type sensor;

detecting, for a first one of said plurality of sensors, a transition into an alarm condition;

determining if said first sensor transitioning into said alarm condition is configured as a non-redundant type or redundant type sensor;

upon determining that said sensor is configured as a non-redundant type sensor, issuing a first notification to a first group of selected recipients; and upon determining that said sensor is configured as a redundant type sensor, issuing a second notification to a second group of selected recipients.

2. A computer-implemented method of issuing a notification of an event according to claim 1 wherein said first notification contains an emergency message and said first group of selected recipients include emergency personnel and wherein said second notification contains a non-emergency message and said second group of selected recipients do not include emergency personnel.

3. A computer-implemented method of issuing a notification of an event according to claim 1 and further comprising the steps of:

assigning each of said sensors configured as a redundant type sensor into a sensor group having at least two of said sensor included therein;

detecting, for a second one of said plurality of sensors, a transition into an alarm condition;

determining if said second sensor transitioning into said alarm condition is configured as a non-redundant type or redundant type sensor;

upon determining that said sensor is configured as a non-redundant type sensor, issuing said first notification to said first group of selected recipients;

upon determining that said sensor is configured as a redundant type sensor, determining if all of said sensors grouped with said second sensor transitioning into said alarm condition have also transitioned into said alarm condition; and upon determining that all of said sensors in said sensor group have transitioned into said alarm condition, issuing said first notification to said first group of selected recipients.

4. A computer-implemented method of issuing a notification of an event according to claim 3 and further comprising the step of issuing said second notification to said second group of selected recipients if all of said sensors in said sensor group have not transitioned into said alarm condition.

5. A computer-implemented method of issuing a notification of an event according to claim 4 and further comprising:

measuring the time elapsed between the transition of said first sensor in said sensor group into said alarm condition and said remaining sensors in said sensor group; and issuing said first notification to said first group of selected recipients if all of said sensors in said sensor group transition into said alarm condition within a preselected time period.

6. A computer-implemented method of issuing a notification of an occurrence of an event within a defined area having a plurality of sensors positioned therein comprising the steps of:

configuring each of said plurality of sensors as either a non-redundant type sensor or a redundant type sensor;

assigning each of said sensors configured as a redundant type sensor into a sensor group, each of said sensor groups having at least two of said sensors included therein;

detecting transitions by respective ones of said plurality of sensors into an alarm condition;

determining if said sensors transitioning into said alarm condition includes at least one sensor configured as a non-redundant type sensor;

if it is determined that said sensors transitioning into said alarm condition includes at least one sensor configured as a non-redundant type sensor, issuing a first notification to a first group of selected recipients;

determining if said sensors transitioning into said alarms condition includes at least one sensor configured as a redundant type sensor;

if it is determined that said sensors transitioning into said alarm condition includes at least one sensor configured as a redundant type sensor, determining, for each of said redundant type sensors transitioning into said alarm condition, if all of said sensors grouped with said redundant type sensors transitioning into said alarm condition have also transitioned into said alarm condition;

if it is determined that all of said sensors grouped with said redundant type sensors transitioning into said alarm condition have also transitioned into said alarm condition, issuing said first notification to said first group of selected recipients; and if it is determined that all of said sensors grouped with said redundant type sensors transitioning into said alarm condition have not transitioned into said alarm condition, issuing a second notification to a second group of selected recipients.

7. A computer-implemented method of issuing a notification of an event according to claim 6 wherein said first notification contains an emergency message and said first group of selected recipients include emergency personnel and wherein said second notification contains a non-emergency message and said second group of selected recipients do not include emergency personnel.

8. A computer-implemented method of issuing a notification of an event according to claim 6 and further comprising:

measuring the time elapsed between the transition of a first sensor in said sensor group into said alarm condition and said remaining sensors in said sensor group; and issuing said first notification to said first group of selected recipients if all of said sensors in said sensor group transition into said alarm condition within a preselected time period after said first sensor transitioned into said alarm condition.

9. A notification system for reporting events occurring within a defined area being monitored by said notification system, comprising:

a plurality of sensors installed at selected locations within said defined area;

a computer system coupled to each of said plurality of sensors, said computer system including:

means for selectively configuring each of said plurality of sensors as either a non-redundant type sensor or a redundant type sensor;

means for detecting an alarm condition for each of said plurality of sensors;

means for determining, from said detected alarm conditions, if an event requiring issuance of a notification has occurred; and means for issuing a notification regarding said event to a recipient;

wherein said means for determining if an event requiring issuance of a notification has occurred further comprises:

means for determining if said detected alarm condition originated at a non-redundant type sensor;

means for determining that an event requiring issuance of a notification has occurred if said detected alarm condition originated at a non-redundant type sensor;
means for determining if said detected alarm condition originated at a redundant type sensor; and
means for determining that an event requiring issuance of a notification has occurred if said detected alarm condition originated at a redundant type sensor and if an alarm condition has been detected for each of a preselected group of at least two of said plurality of sensors, said preselected group including said redundant type sensor at which said alarm condition originated.

10. A notification system for reporting events according to claim 9 and further comprising means for issuing a limited notification if said detected alarm condition originated at a redundant type sensor and an alarm condition has not been detected for each one of said preselected group of sensors.

11. A notification system for reporting events according to claim 9 and further comprising:
means for determining time elapsed between detection of an alarm condition for a first sensor of said preselected group of sensors and detection of an alarm condition for the remaining sensors of said preselected group; and
means for determining that an event requiring issuance of a notification has occurred if said first sensor at which said detected alarm condition originated is a redundant type sensor and if an alarm condition has been detected for each of said preselected group of sensors within a preselected time period after said alarm condition was detected for said first sensor.

12. A notification system for reporting events according to claim 9 and further comprising:
means for determining time elapsed between detection of an alarm condition for a first sensor of said preselected group of sensors and detection of an alarm condition for the remaining sensors of said preselected group;
means for determining that an event requiring issuance of a notification has occurred if said first sensor at which said detected alarm condition originated is a redundant type sensor and if an alarm condition has been detected for each of said preselected group of sensors within a preselected time period after said alarm condition was detected for said first sensor; and
means for issuing a limited notification if said first sensor at which said detected alarm condition originated is a redundant type sensor and if an alarm condition has not been detected for each of said preselected group of sensors within said preselected time period after said alarm condition was detected for said first sensor.

13. A notification system for reporting events occurring within a defined area being monitored by said notification system, comprising:
a plurality of sensors installed at selected locations within said defined area;
a sensor interface coupled to each of said sensors, said sensor interface including means for periodically polling each of said sensors and means for storing status information for each of said sensors;
a computer system coupled to said sensor interface, said computer system including:
means for selectively configuring each of said plurality of sensors as either a non-redundant type sensor or a redundant type sensor;
means for polling said sensor interface for said stored status information;
means for determining, from said status information, whether an alarm condition has been detected for each of said plurality of sensors;
means for determining, from said detected alarm conditions, if an event requiring issuance of a notification has occurred; and
means for issuing a notification regarding said event to a recipient;
wherein said means for determining if an event requiring issuance of a notification has occurred further comprises:
means for determining if said detected alarm condition originated at a non-redundant type sensor;
means for determining that an event requiring issuance of a notification has occurred if said detected alarm condition originated at a non-redundant type sensor;
means for determining if said detected alarm condition originated at a redundant type sensor; and
means for determining that an event requiring issuance of a notification has occurred if said detected alarm condition originated at a redundant type sensor and if an alarm condition has been detected for each one of a promulgated group of at least two of said plurality of sensors.

14. A notification system for reporting events according to claim 13 and further comprising means for issuing a limited notification if said detected alarm condition originated at a redundant type sensor and an alarm condition has not been detected for each one of said preselected group of sensors.

15. A notification system for reporting events according to claim 13 and further comprising:
means for determining time elapsed between detection of an alarm condition for a first sensor of said preselected group of sensors and detection of an alarm condition for the remaining sensors of said preselected group; and
means for determining that an event requiring issuance of a notification has occurred if said first sensor at which said detected alarm condition originated is a redundant type sensor and if an alarm condition has been detected for each of said preselected group of sensors within a preselected time period after detection of said alarm condition for said first sensor.

16. A notification system for reporting events according to claim 13 and further comprising:
means for determining time elapsed between detection of an alarm condition for a first sensor of said preselected group of sensors and detection of an alarm condition for the remaining sensors of said preselected group;
means for determining that an event requiring issuance of a notification has occurred if said first sensor at which said detected alarm condition is a redundant type sensor and if an alarm condition has been detected for each of said preselected group of sensors within a preselected time period after detection of said alarm condition for said first sensor; and
means for issuing a limited notification if said first sensor at which said detected alarm condition originated is a redundant type sensor and if an alarm condition has not been detected for each of said preselected group of sensors within said preselected time period after detection of said alarm condition for said first sensor.

* * * * *